United States Patent
Strnad et al.

(10) Patent No.: US 12,022,760 B2
(45) Date of Patent: Jul. 2, 2024

(54) AGRICULTURAL OPERATION MONITORING APPARATUS, SYSTEMS AND METHODS

(71) Applicant: Precision Planting LLC, Tremont, IL (US)

(72) Inventors: Michael Strnad, Delavan, IL (US); Dale Koch, Tremont, IL (US); Matthew Morgan, Peoria, IL (US)

(73) Assignee: Precision Planting LLC, Tremont, IL (US)

( * ) Notice: Subject to any disclaimer, the term of this patent is extended or adjusted under 35 U.S.C. 154(b) by 730 days.

(21) Appl. No.: 16/972,966

(22) PCT Filed: Jun. 7, 2019

(86) PCT No.: PCT/US2019/036038
§ 371 (c)(1),
(2) Date: Dec. 7, 2020

(87) PCT Pub. No.: WO2019/236990
PCT Pub. Date: Dec. 12, 2019

(65) Prior Publication Data
US 2021/0243939 A1    Aug. 12, 2021

Related U.S. Application Data

(60) Provisional application No. 62/682,156, filed on Jun. 7, 2018.

(51) Int. Cl.
*A01B 79/00* (2006.01)
*A01B 27/00* (2006.01)
(Continued)

(52) U.S. Cl.
CPC .......... *A01B 79/005* (2013.01); *A01B 27/005* (2013.01); *A01B 63/008* (2013.01);
(Continued)

(58) Field of Classification Search
CPC ..... A01B 79/005; A01B 79/02; A01B 27/005; A01B 63/008; G01S 17/894; A01C 5/064; A01C 7/04; A01C 7/203
See application file for complete search history.

(56) References Cited

U.S. PATENT DOCUMENTS

| 6,918,342 B2 | 7/2005 | Sauder et al. |
| 7,370,589 B2 | 5/2008 | Wilkerson et al. |

(Continued)

FOREIGN PATENT DOCUMENTS

| WO | 2012/129442 A2 | 9/2012 |
| WO | 2012/149415 A1 | 11/2012 |

(Continued)

OTHER PUBLICATIONS

European Patent Office, Search Report for related European Application No. 19 815 157.3, dated Feb. 7, 2022.
(Continued)

*Primary Examiner* — Tara Mayo

(57) ABSTRACT

Systems, methods and apparatus for imaging and characterizing a soil surface and a trench in the soil surface formed by an agricultural implement. The sensors are disposed on the agricultural implement in data communication with a processor to generate the soil surface and trench images which may be displayed to the operator. In one embodiment, the sensors include one or more time of flight cameras for determining a depth of the trench and other characteristics of the surrounding soil surface and the trench, including detection of seeds, soil or other debris in the trench and moisture lines within the trench. The system may control operating parameters of the implement based on the generated images.

17 Claims, 22 Drawing Sheets

(51) Int. Cl.
   *A01B 63/00* (2006.01)
   *A01B 79/02* (2006.01)
   *A01C 5/06* (2006.01)
   *A01C 7/04* (2006.01)
   *A01C 7/20* (2006.01)
   *G01S 17/894* (2020.01)

(52) U.S. Cl.
   CPC .............. *A01B 79/02* (2013.01); *A01C 5/064* (2013.01); *A01C 7/04* (2013.01); *A01C 7/203* (2013.01); *G01S 17/894* (2020.01)

(56) References Cited

U.S. PATENT DOCUMENTS

| | | | |
|---|---|---|---|
| 8,078,367 | B2 | 12/2011 | Sauder et al. |
| 8,204,689 | B2 | 6/2012 | Christy et al. |
| 8,408,149 | B2 | 4/2013 | Rylander |
| 8,550,020 | B2 | 10/2013 | Sauder et al. |
| 8,794,164 | B2 | 8/2014 | Sauder et al. |
| 9,144,189 | B2 | 9/2015 | Stoller et al. |
| 9,179,595 | B2 | 11/2015 | Kormann et al. |
| 9,288,937 | B2 | 3/2016 | Sauder et al. |
| 2008/0006189 | A1 | 1/2008 | Johnston et al. |
| 2010/0180695 | A1 | 7/2010 | Sauder et al. |
| 2011/0076478 | A1 | 3/2011 | Haynes et al. |
| 2012/0048159 | A1* | 3/2012 | Adams et al. .......... A01C 7/203 111/163 |
| 2012/0151910 | A1* | 6/2012 | Sauder et al. ........ F15B 11/042 60/459 |
| 2015/0305228 | A1 | 10/2015 | Zemenchik |
| 2015/0354943 | A1* | 12/2015 | Posselius et al. .... G01B 11/026 73/1.79 |
| 2016/0037709 | A1 | 2/2016 | Sauder et al. |
| 2018/0114305 | A1 | 4/2018 | Strnad et al. |
| 2018/0125000 | A1 | 5/2018 | Levy et al. |
| 2018/0125002 | A1 | 5/2018 | Stoller et al. |
| 2020/0352088 | A1 | 11/2020 | Arnett et al. |

FOREIGN PATENT DOCUMENTS

| | | |
|---|---|---|
| WO | 2013/049198 A1 | 4/2013 |
| WO | 2014/066664 A1 | 5/2014 |
| WO | 2014/186810 A1 | 11/2014 |
| WO | 2015/171915 A1 | 11/2015 |
| WO | 2016/182906 A1 | 11/2016 |
| WO | 2017/143121 A1 | 8/2017 |
| WO | 2017/143125 A1 | 8/2017 |

OTHER PUBLICATIONS

US Patent Office, International Search Report for International Application No. PCT/US2019/036038, dated Oct. 15, 2019.

* cited by examiner

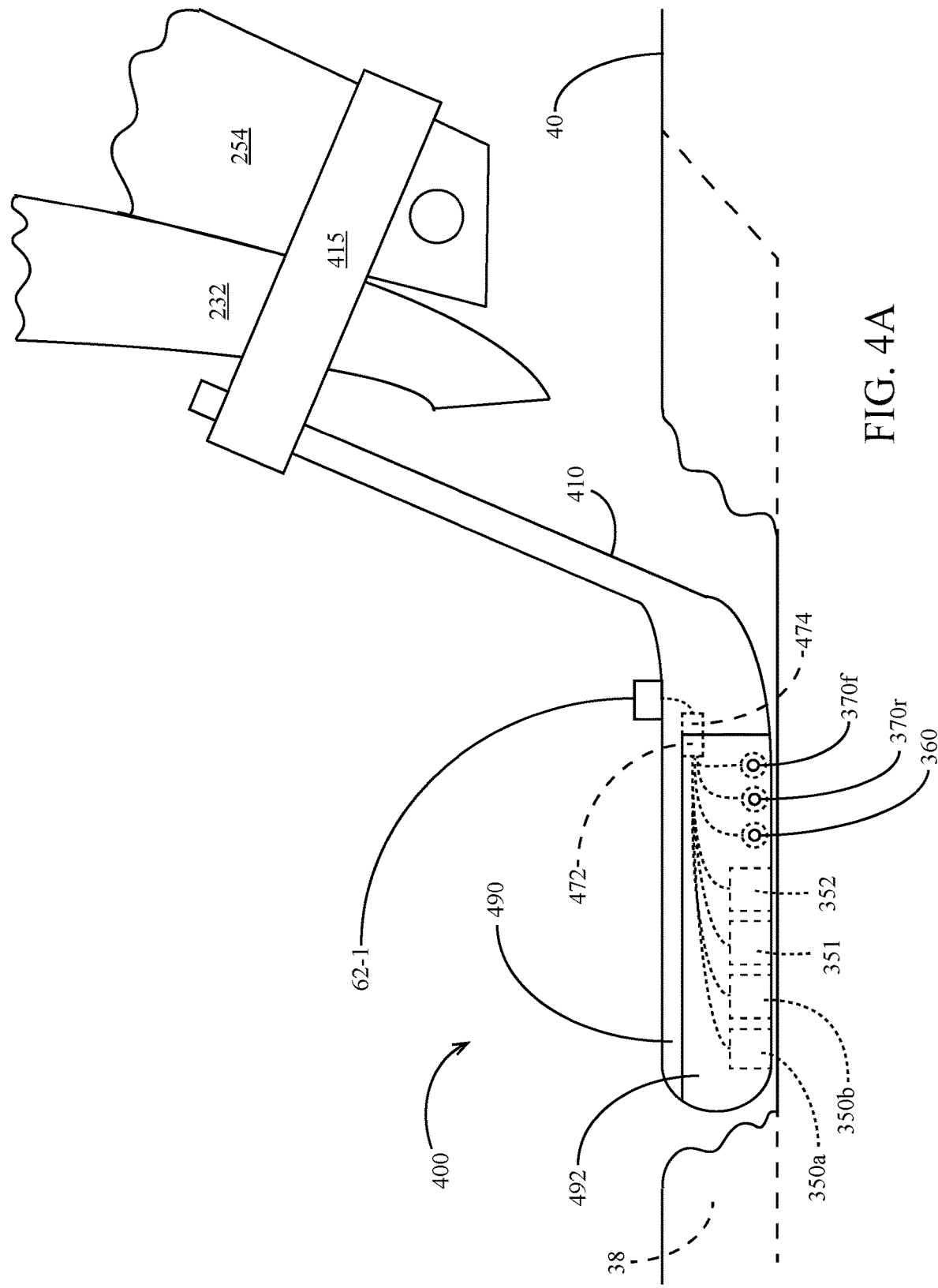

AGRICULTURAL OPERATION MONITORING APPARATUS, SYSTEMS AND METHODS

BACKGROUND

In recent years, the availability of advanced location-specific agricultural application and measurement systems (used in so-called "precision farming" practices) has increased grower interest in determining spatial variations in soil and in varying input application variables (e.g., planting depth) in light of such variations. Thus, there is a need in the art for a system for characterizing a seed trench during an agricultural input application.

BRIEF DESCRIPTION OF THE DRAWINGS

FIG. 4A is a side elevation view of an embodiment of a seed firmer having a plurality of firmer-mounted sensors.

DESCRIPTION

Depth Control and Soil Monitoring Systems

Figure 1:
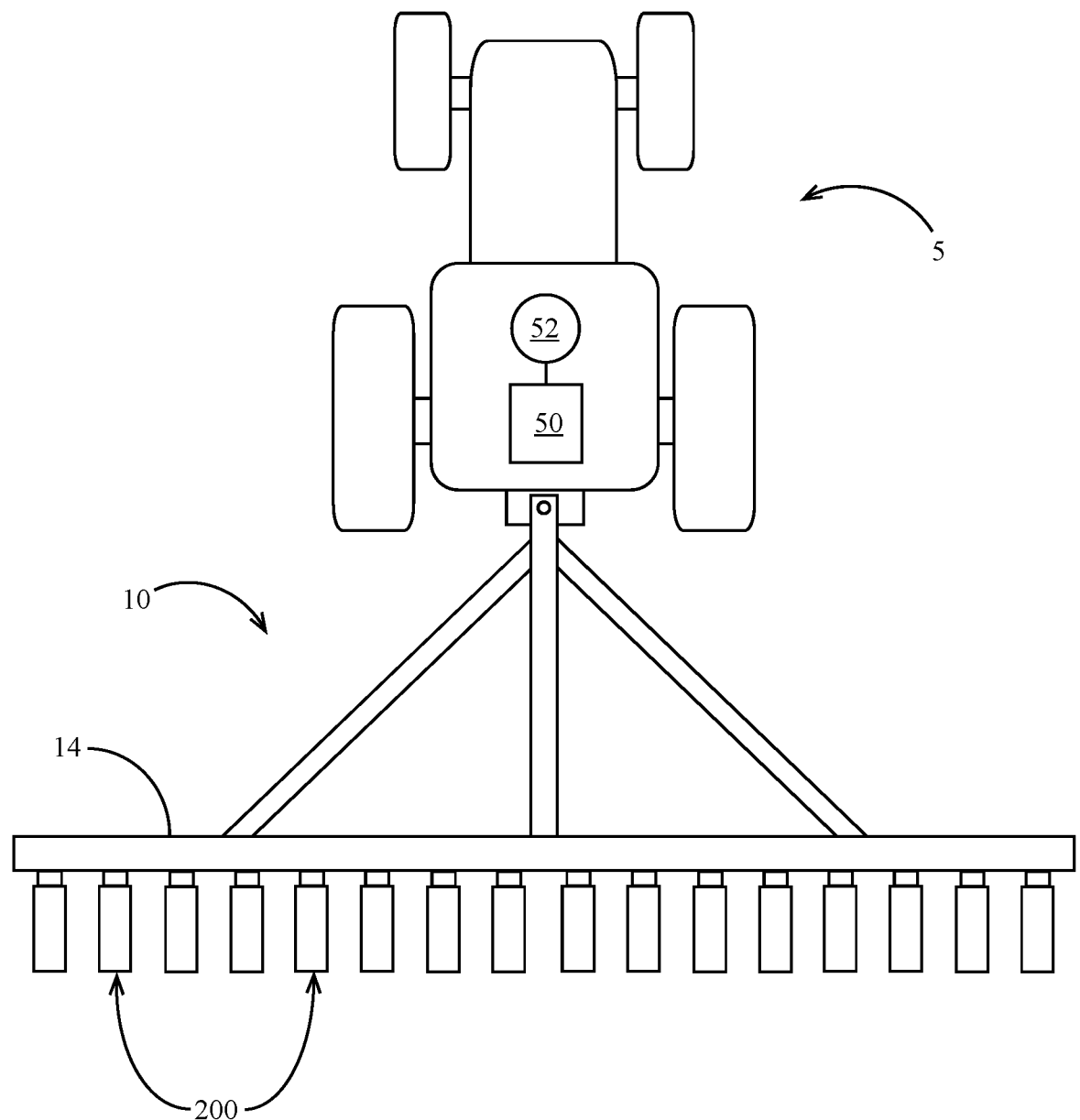
FIG. 1 is a top view of an embodiment of an agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 is shown located in the cab of the tractor 5. The implement monitor 50 may include a central processing unit ("CPU"), memory and graphical user interface ("GUI") (e.g., a touch-screen interface). A global positioning system ("GPS") receiver 52 may be mounted to the tractor 5.

Figure 2:
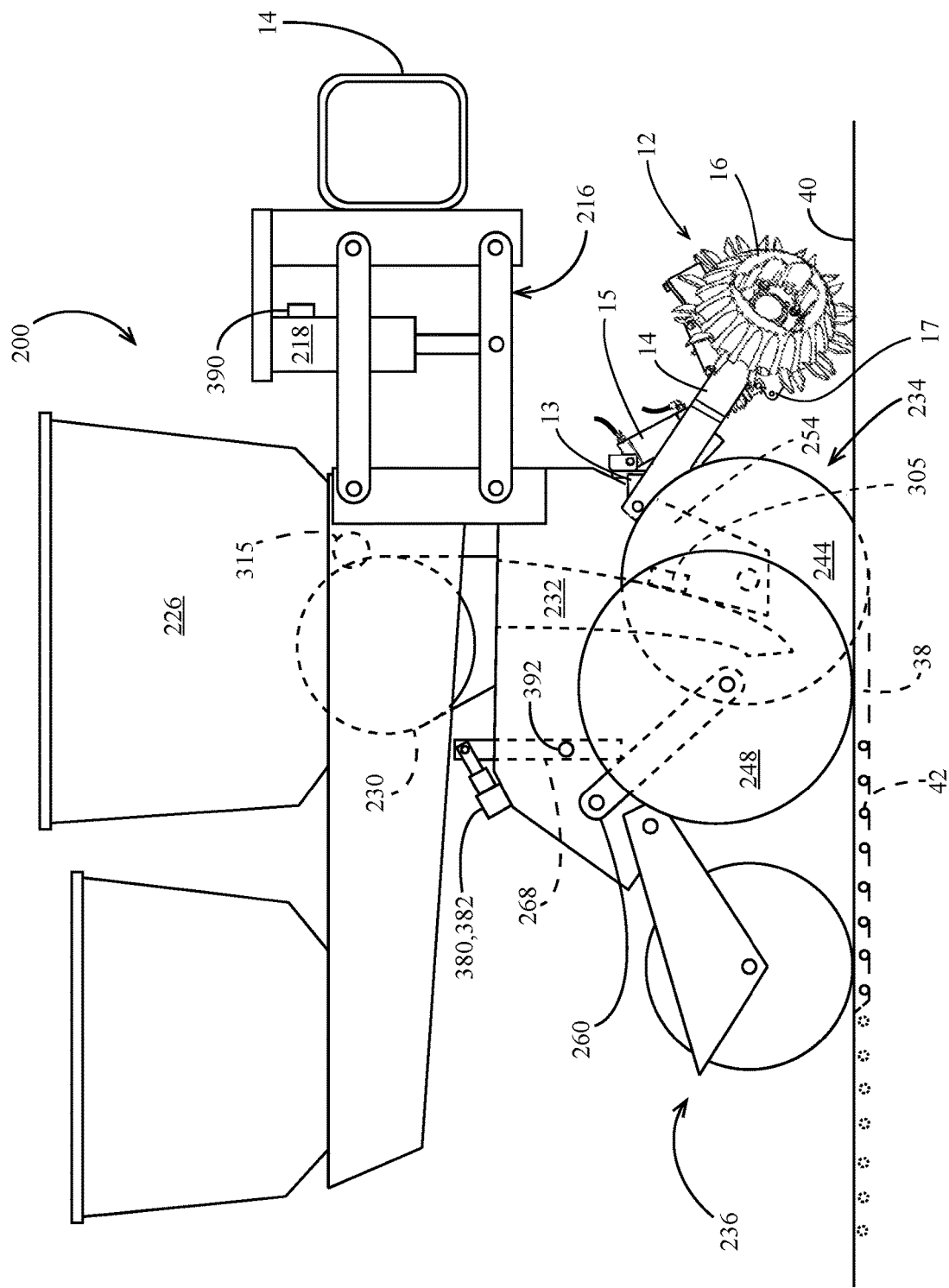
FIG. 2 is a side elevation view of an embodiment of a planter row unit.

FIG. 2 is a side elevation view of an embodiment of a row unit 200, such as a planter row unit. The row unit 200 is pivotally connected to the toolbar 14 by a parallel linkage 216. The row unit supports an opening assembly 234 and a closing assembly 236. An actuator 218 may be provided to apply lift and/or downforce on the row unit 200. A solenoid valve 390 is shown in fluid communication with the actuator 218 for modifying the lift and/or downforce applied by the actuator 218. The opening assembly 234 may include two opening discs 244 rollingly mounted to a downwardly-extending shank 254 and disposed to open a v-shaped trench 38 in the soil surface 40. A pair of gauge wheels 248 is pivotally supported by a pair of corresponding gauge wheel arms 260. The height of the gauge wheels 248 relative to the opening discs 244 sets the depth of the trench 38. A depth adjustment rocker 268 limits the upward travel of the gauge wheel arms 260 and thus the upward travel of the gauge wheels 248. A depth adjustment actuator 380 is configured to modify a position of the depth adjustment rocker 268 and thus modifying the position of the gauge wheels 248 relative to the opening discs 244. The depth adjustment actuator 380 may be a linear actuator mounted to the row unit 200 and pivotally coupled to an upper end of the rocker 268. In some embodiments the depth adjustment actuator 380 may comprise any of depth adjustment systems as disclosed in International Patent Publication Nos. WO2017/143125 and WO2017/143121, or WO2012/149415, the disclosures of which are hereby incorporated herein by reference in their entireties. An encoder 382 may be configured to generate a signal related to the linear extension of the actuator 380. It should be appreciated that the linear extension of the depth adjustment actuator 380 is related to the depth of the trench 38 when the gauge wheel arms 260 are in contact with the rocker 268. A downforce sensor 392 may be provided to generate a signal related to the amount of force imposed by the gauge wheels 248 on the soil surface 40. In some embodiments, the downforce sensor 392 comprises an instrumented pin about which the rocker 268 is pivotally coupled to the row unit 200, such as those instrumented pins disclosed in U.S. Patent Publication No. US2010/0180695, the disclosure of which is hereby incorporated herein by reference in its entirety. Additionally, desired downforce can be achieved by the system and methods for downforce control disclosed in U.S. Pat. Nos. 9,288,937 and 9,144,189, the disclosures of which are hereby incorporated herein by reference in their entireties.

Continuing to refer to FIG. 2, a seed meter 230 such as that disclosed in Applicant's International Patent Publication No. WO2012/129442, the disclosure of which is hereby incorporated herein by reference in its entirety, deposits seeds 42 from a hopper 226 into the trench 38 via a seed tube 232 disposed to guide the seeds toward the trench. Alternatively, a seed conveyor 232', such as disclosed in International Publication No. WO2013/049198, the disclosure of which is hereby incorporated herein by reference in its entirety, may be utilized in place of the seed tube 232. A drive mechanism 315, which may be electric or hydraulic, may drive a seed disc within the seed meter. A seed sensor 305 may be mounted to the seed tube 232 to generate a signal indicating passage of a seed. The seed sensor 305 may be an optical or electromagnetic seed sensor configured to send light or electromagnetic waves across the path of the seeds 42. The closing assembly 236 is pivotally coupled to the row unit 200 and may include one or more closing wheels 238 configured to close the trench 38 after the seeds are deposited.

Continuing to refer to FIG. 2, a row cleaner assembly 12, such as disclosed in U.S. Pat. No. 8,550,020, the disclosure of which is hereby incorporated herein by reference in its entirety, is mounted to the forward end of the row unit 200 via a bracket 13 attached to the shank 254. Row cleaner arms 14 are attached to the bracket 13 and extend downward to row cleaner wheels 16. An actuator 15 is disposed between the bracket 13 and a plate 17, which is mounted to forwardly extending row cleaner arms 14. The actuator 15 may be in signal communication with the monitor 50 for receiving signals to increase or decrease a downforce applied to the row cleaner assembly 12. The actuator 15 may be a pneumatic actuator as described in U.S. Pat. No. 8,550,020, or the actuator 15 may be hydraulic, electromechanical, or combinations thereof. The actuator 15 may be double acting or single acting.

Figure 3:
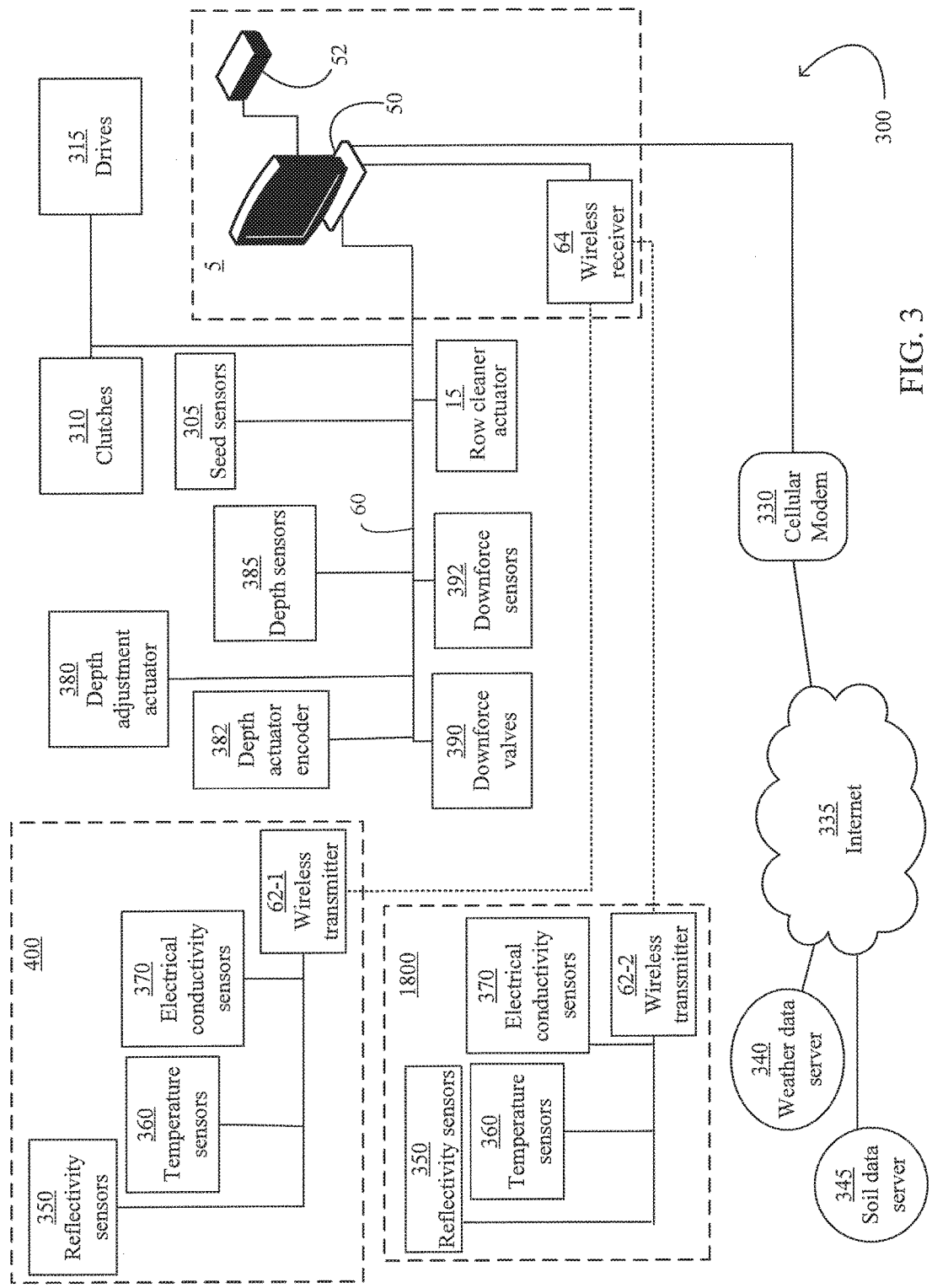
FIG. 3 schematically illustrates an embodiment of a soil monitoring system.

Turning to FIG. 3, a depth control and soil monitoring system 300 is schematically illustrated. The monitor 50 may be in data communication with components associated with each row unit 200 including the drives 315, the seed sensors 305, the GPS receiver 52, the downforce sensors 392, the downforce valves 390, the depth adjustment actuator 380, the depth actuator encoders 382 and the row cleaner actuator 15. In some embodiments, particularly those in which each seed meter 230 is not driven by an individual drive 315, the monitor 50 may be in data communication with clutches 310 configured to selectively operably couple the seed meter 230 to the drive 315.

The monitor 50 may be in data communication with a cellular modem 330 or other component configured to place the monitor 50 in data communication with the Internet, indicated by reference numeral 335. Via the Internet connection, the monitor 50 may receive data from a weather data server 340 and a soil data server 345. The monitor 50 may also be in data communication with one or more temperature sensors 360 mounted to the planter 10 and configured to generate a signal related to the temperature of soil being worked by the planter row units 200. The monitor 50 may additionally be in data communication with one or more reflectivity sensors 350 mounted to the planter 10 and configured to generate a signal related to the reflectivity of soil being worked by the planter row units 200. The monitor may also be in data communication with one or more temperature sensors 360 and electrical conductivity sensors 370 mounted to the planter 10 and configured to respectively generate a signal related to the temperature and electrical conductivity of the soil being worked by the planter row units 200.

In some embodiments, a first set of reflectivity sensors 350, temperature sensors 360, and electrical conductivity sensors 370 are mounted to a soil engaging component 400, such as a seed firmer, disposed to measure reflectivity, temperature and electrical conductivity, respectively, of soil in the trench 38. In some embodiments, a second set of reflectivity sensors 350, temperature sensors 360, and electrical conductivity sensors 370 are mounted to a reference sensor assembly 1800 and disposed to measure reflectivity, temperature and electrical conductivity, respectively, of the soil, preferably at a depth different than the sensors on the soil engaging component 400.

In some embodiments, a subset of the sensors are in data communication with the monitor 50 via a bus 60 (e.g., a CAN bus). In some embodiments, the sensors mounted to the seed firmer 400 and the reference sensor assembly 1800 are likewise in data communication with the monitor 50 via the bus 60. However, in the embodiment illustrated in FIG. 3, the sensors mounted to the soil engaging component 400 and the reference sensor assembly 1800 are in data communication with the monitor 50 via a first wireless transmitter 62-1 and a second wireless transmitter 62-2, respectively. The wireless transmitters 62 at each row unit may be in data communication with a single wireless receiver 64 which is in turn in data communication with the monitor 50. The wireless receiver may be mounted to the toolbar 14 or in the cab of the tractor 5.

Soil Monitoring, Seed Monitoring and Seed Firming Apparatus

Figure 4B:
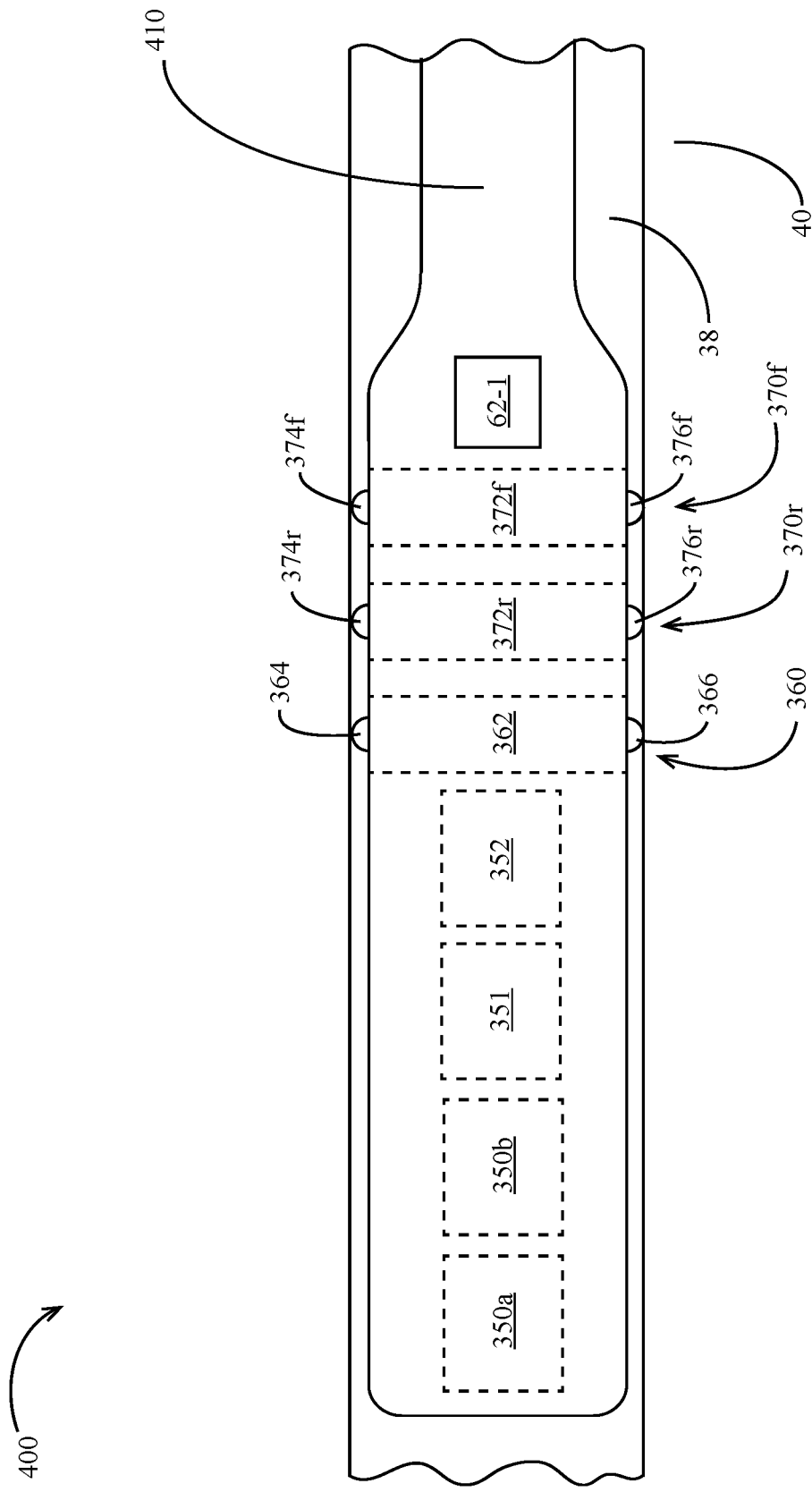
FIG. 4B is a plan view of the seed firmer of FIG. 4A.
Figure 4C:
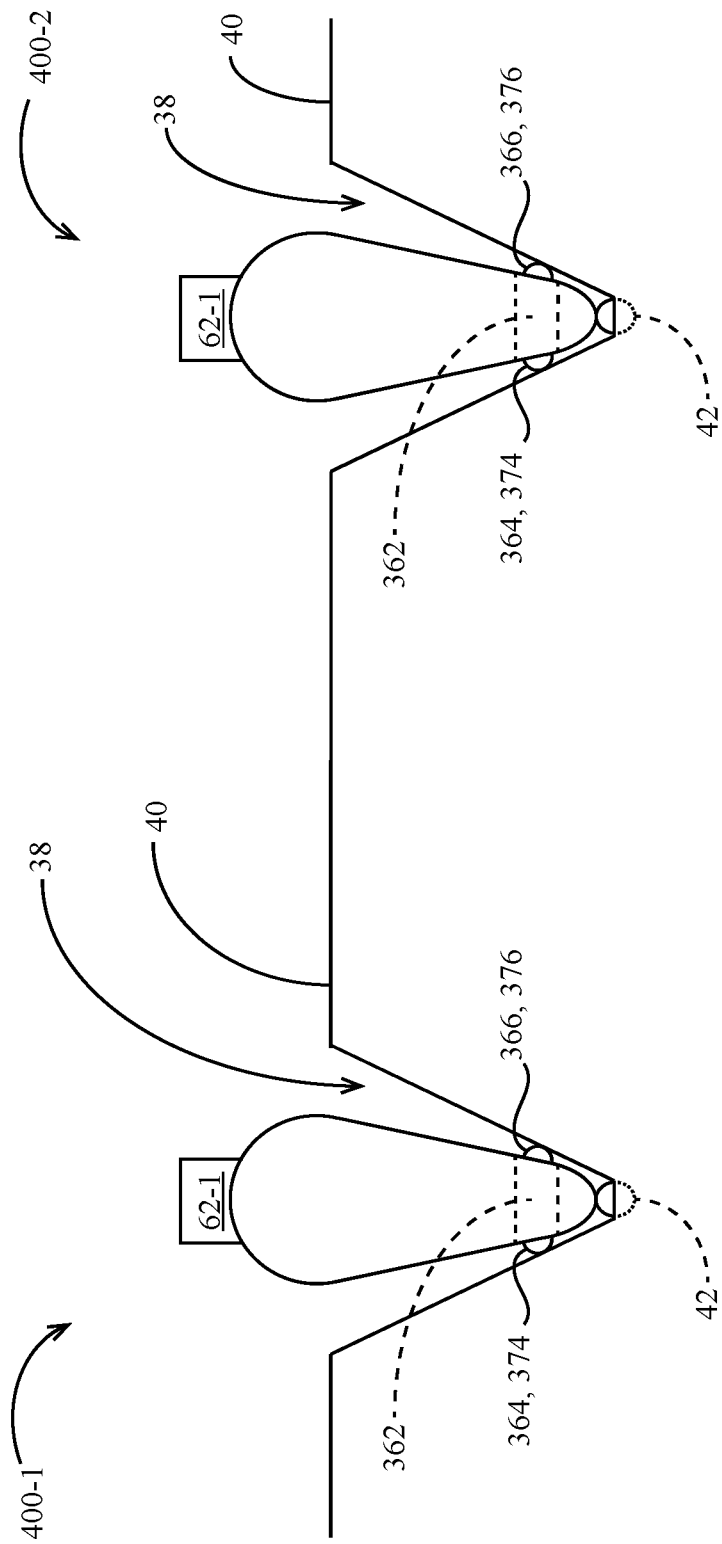
FIG. 4C is a rear elevation view of the seed firmer of FIG. 4A disposed in a seed trench.

Turning to FIGS. 4A-4C, an embodiment of the soil engaging component comprising a seed firmer 400 is illustrated having a plurality of sensors for sensing soil characteristics. In this embodiment, the seed firmer 400 includes a flexible portion 410 mounted to the shank 254 and/or the seed tube 232 by a bracket 415. In some embodiments, the bracket 415 is similar to one of the bracket embodiments disclosed in U.S. Pat. No. 6,918,342 or U.S. Pat. No. 8,794,164, the disclosures of which are hereby incorporated herein by reference in their entireties. The seed firmer includes a firmer body 490 disposed and configured to be received at least partially within v-shaped trench 38 and firm seeds 42 into the bottom of the trench. When the seed firmer 400 is lowered into the trench 38, the flexible portion 410 urges the firmer body 490 into resilient engagement with the bottom of the trench. In some embodiments the flexible portion 410 may include an external or internal reinforcement as disclosed in International Patent Publication No. WO2014/066664, the disclosure of which is hereby incorporated herein by reference in its entirety. In some embodiments the firmer body 490 includes a removable portion 492 which may slide into locking engagement with the remainder of the firmer body 490. Alternatively, the removable portion 492 may be attached to firmer body 490 with a removable fastener, such as a screw. The firmer body 490 (which includes the portion engaging the soil, which in some embodiments comprises the removable portion 492) may be made of a material (or has an outer surface or coating) having hydrophobic and/or anti-stick properties, e.g. a Teflon graphite coating and/or comprising a polymer having a hydrophobic material (e.g., silicone oil or polyether-ether-ketone) impregnated therein. The sensors may be disposed within the removable portion 492 or anywhere on the firmer body 490 depending on the soil characteristics being detected, including on the bottom and on the sides of the firmer body 490.

The seed firmer 400 may include a plurality of reflectivity sensors 350a, 350b. Each reflectivity sensor 350 may be disposed and configured to measure reflectivity of soil. In a preferred embodiment, the reflectivity sensor 350 is disposed to measure soil in the trench 38, and at the bottom of the trench. The reflectivity sensor 350 may include a lens disposed in the bottom of the firmer body 490 and disposed to engage the soil at the bottom of the trench 38. In some embodiments the reflectivity sensor 350 comprises one of the embodiments disclosed in U.S. Pat. No. 8,204,689 and/or WO2014/186810, both of which are hereby incorporated herein by reference in their entireties. In various embodiments, the reflectivity sensor 350 is configured to measure reflectivity in the visible range (e.g., 400 and/or 600 nanometers), in the near-infrared range (e.g., 940 nanometers) and/or elsewhere in the infrared range.

The seed firmer 400 may include a capacitive moisture sensor 351 disposed and configured to measure capacitance moisture of the soil in the seed trench 38, such as at the bottom of the trench 38. The seed firmer 400 may also include an electronic tensiometer sensor 352 disposed and configured to measure soil moisture tension of the soil in the seed trench 38, such as at the bottom of trench 38. Alternatively, soil moisture tension can be extrapolated from capacitive moisture measurements or from reflectivity measurements (such as at 1450 nm). Which may be done using a soil water characteristic curve based on the soil type.

The seed firmer 400 may further include a temperature sensor 360 disposed and configured to measure temperature of soil. In one embodiment, the temperature sensor 360 is disposed to measure soil in the trench 38, at or adjacent the bottom of the trench 38. The temperature sensor 360 may include soil-engaging ears 364, 366 (FIGS. 4B, 4C) disposed to slidingly engage each side of the trench 38 as the planter traverses the field. The ears 364, 366 may engage the trench 38 at or adjacent to the bottom of the trench. The ears 364, 366 may be made of a thermally conductive material such as copper. The ears 364 may be fixed to and in thermal communication with a central portion 362 housed within the firmer body 490. The central portion 362 may comprise a thermally conductive material such as copper. In some embodiments, the central portion 362 comprises a hollow copper rod. The central portion 362 may be in thermal communication with a thermocouple fixed to the central portion.

The seed firmer may also include a plurality of electrical conductivity sensors 370r, 370f. Each electrical conductivity sensor 370 may be disposed and configured to measure electrical conductivity of soil. In one embodiment, the electrical conductivity sensor is disposed to measure electrical conductivity of soil in the trench 38, such as at or adjacent the bottom of the trench 38. The electrical conductivity sensor 370 may include soil-engaging ears 374, 376 (FIG. 4B, 4C) disposed to slidingly engage each side of the trench 38 as the planter traverses the field. The ears 374, 376 may engage the trench 38 at or adjacent to the bottom of the trench. The ears 374, 376 may be made of an electrically conductive material such as copper. The ears 374 may be fixed to and in electrical communication with a central portion 372 housed within the firmer body 490. The central portion 372 may comprise an electrically conductive material such as copper. In some embodiments the central portion 372 comprises a copper rod. The central portion 372 may be in electrical communication with an electrical lead fixed to the central portion. The electrical conductivity sensor may measure the electrical conductivity within a trench by measuring the electrical current between soil-engaging ears 374 and 376.

Referring to FIG. 4B, in some embodiments the system 300 measures electrical conductivity of soil adjacent the trench 38 by measuring an electrical potential between the forward electrical conductivity sensor 370f and the rearward electrical conductivity sensor 370r.

Referring to FIG. 4C, in some embodiments the system 300 measures electrical conductivity of soil between two row units 200 having a first seed firmer 400-1 and a second seed firmer 400-2, respectively, by measuring an electrical potential between an electrical conductivity sensor on the first seed firmer 400-1 and an electrical conductivity sensor on the second seed firmer 400-2.

The reflectivity sensors 350, the capacitive moisture sensors 351, the electronic tensiometer sensors 352, the temperature sensors 360, and the electrical conductivity sensors 370 (collectively, the "firmer-mounted sensors") are preferably in data communication with the monitor 50. In some embodiments, the firmer-mounted sensors are in data communication with the monitor 50 via a transceiver (e.g., a CAN transceiver) and the bus 60. In other embodiments, the firmer-mounted sensors are in data communication with the monitor 50 via wireless transmitter 62-1 (which may be mounted to the seed firmer) and wireless receiver 64. In some embodiments, the firmer-mounted sensors are in electrical communication with the wireless transmitter 62-1 (or the transceiver) via a multi-pin connector comprising a male coupler 472 and a female coupler 474. In the firmer body embodiments having a removable portion 492, the male coupler 472 is preferably mounted to the removable portion and the female coupler 474 is may be mounted to the remainder of the firmer body 490. The couplers 472, 474 may be disposed such that the couplers engage electrically as the removable portion is slidingly mounted to the firmer body 490.

It should be appreciated that the sensor embodiment of FIGS. 4A-4C may be mounted to and used in conjunction with implements other than seed planters such as tillage tools. For example, the seed firmer could be disposed to contact soil in a trench opened by (or soil surface otherwise passed over by) a tillage implement such as a disc harrow or soil ripper. On such equipment, the sensors could be mounted on a part of the equipment that contacts soil or on any extension that is connected to a part of the equipment and contacts soil. It should be appreciated that in some such embodiments, the seed firmer would not contact planted seed but would still measure and report soil characteristics as otherwise disclosed herein.

Data Processing and Display

Figure 5:
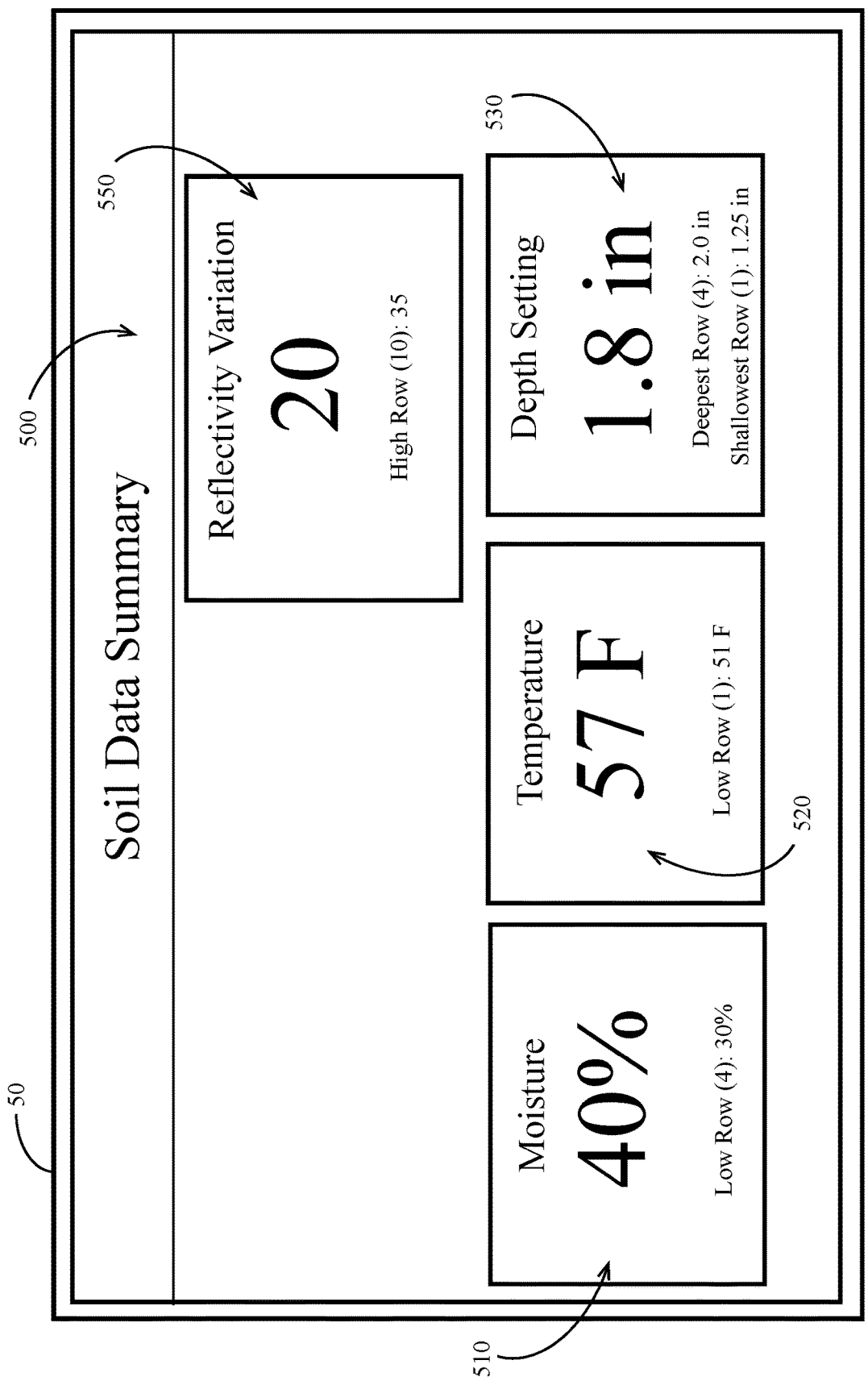
FIG. 5 illustrates an embodiment of a graphical display including a numerical representation of reflectivity variation.

Referring to FIG. 5, the implement monitor 50 may display a soil data summary 500 displaying a representation (e.g., numerical or legend-based representation) of soil data gathered using the seed firmer 400 and associated sensors. The soil data may be displayed in windows such as a soil moisture window 510 and soil temperature window 520. A depth setting window 530 may additionally show the current depth setting of the row units of the implement, e.g., the depth at which the seed firmers 400 are making their respective measurements. A reflectivity variation window 550 may show a statistical reflectivity variation during a threshold period (e.g., the prior 30 seconds) or over a threshold distance traveled by the implement (e.g., the preceding 30 feet). The statistical reflectivity variation may comprise any function of the reflectivity signal (e.g., generated by each reflectivity sensor 350) such as the variance or standard deviation of the reflectivity signal. The monitor 50 may additionally display a representation of a predicted agronomic result (e.g., percentage of plants successfully emerged) based on the reflectivity variation value. For example, values of reflectivity may be used to look up a predicted plant emergence value in an empirically-generated database (e.g., stored in memory of the implement monitor 50 or stored in and updated on a remote server in data communication with the implement monitor) associating reflectivity values with predicted plant emergence.

Figure 6:
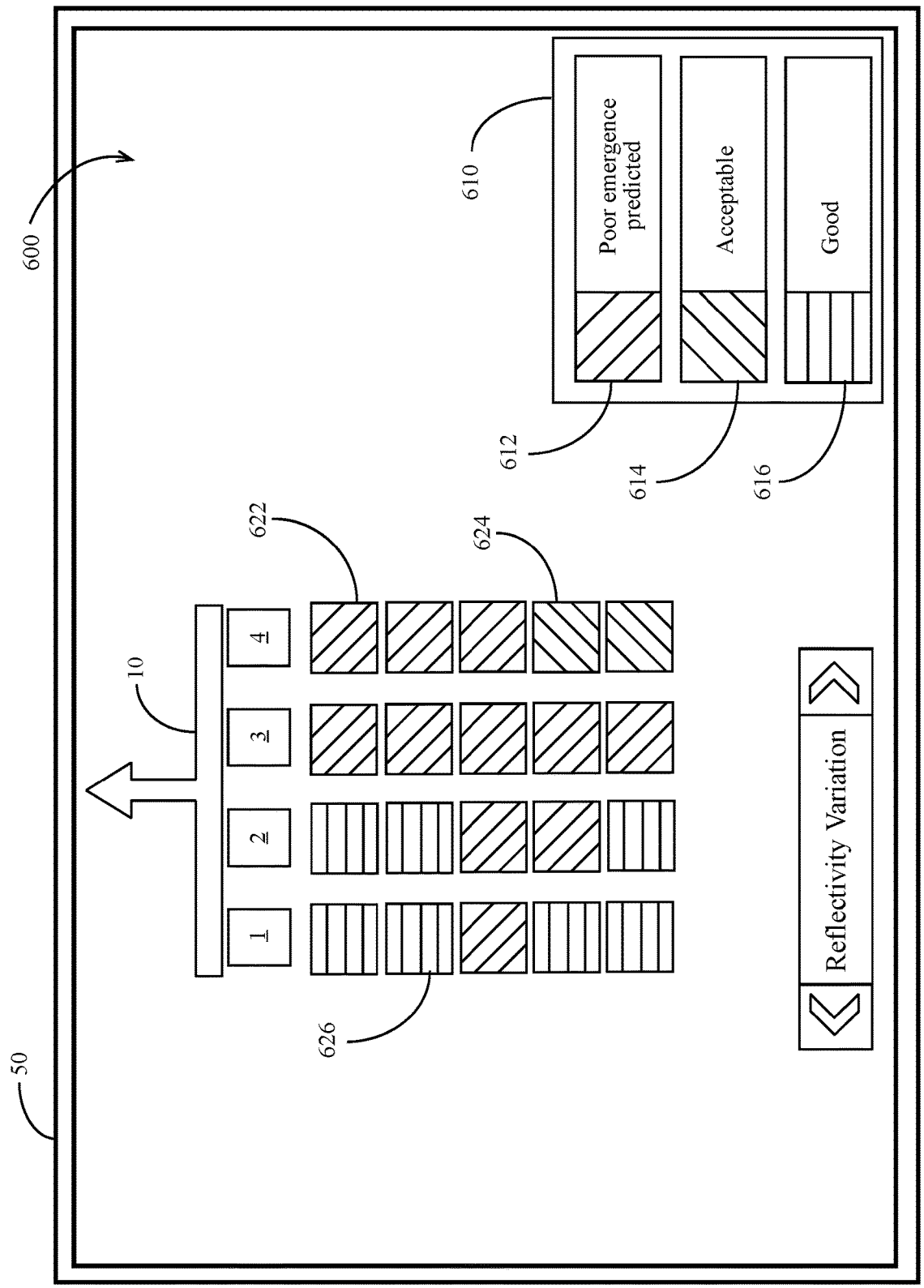
FIG. 6 illustrates an embodiment of a graphical display including a spatial map of reflectivity variation.

Referring to FIG. 6, the reflectivity variation may be displayed spatially on a spatial reflectivity variation map 600 displayed (e.g., on the implement monitor 50 or remote computer). Areas of the field may be associated with graphical representations 622, 624, 626 (e.g., pixels or blocks) associated by color or pattern with subsets 612, 614, 616, respectively of a legend 610. The subsets may correspond to numerical ranges of reflectivity variation. The subsets may be named according to an agronomic indication empirically associated with the range of reflectivity variation. For example, a reflectivity variation below a first threshold at which no emergence failure is predicted may be labeled "Good"; a reflectivity variation between the first threshold and a second threshold at which predicted emergence failure is agronomically unacceptable (e.g., is likely to affect yield by more than a yield threshold) may be labeled "Acceptable" a reflectivity variation above the second threshold may be labeled "Poor emergence predicted".

Each window in the soil data summary 500 may show an average value for all row units ("rows") at which the measurement is made and optionally the row unit for which the value is highest and/or lowest along with the value associated with such row unit or row units. Selecting (e.g., clicking or tapping) each window may shows the individual (row-by-row) values of the data associated with the window for each of the row units at which the measurement is made.

Image Capture

Figure 7:
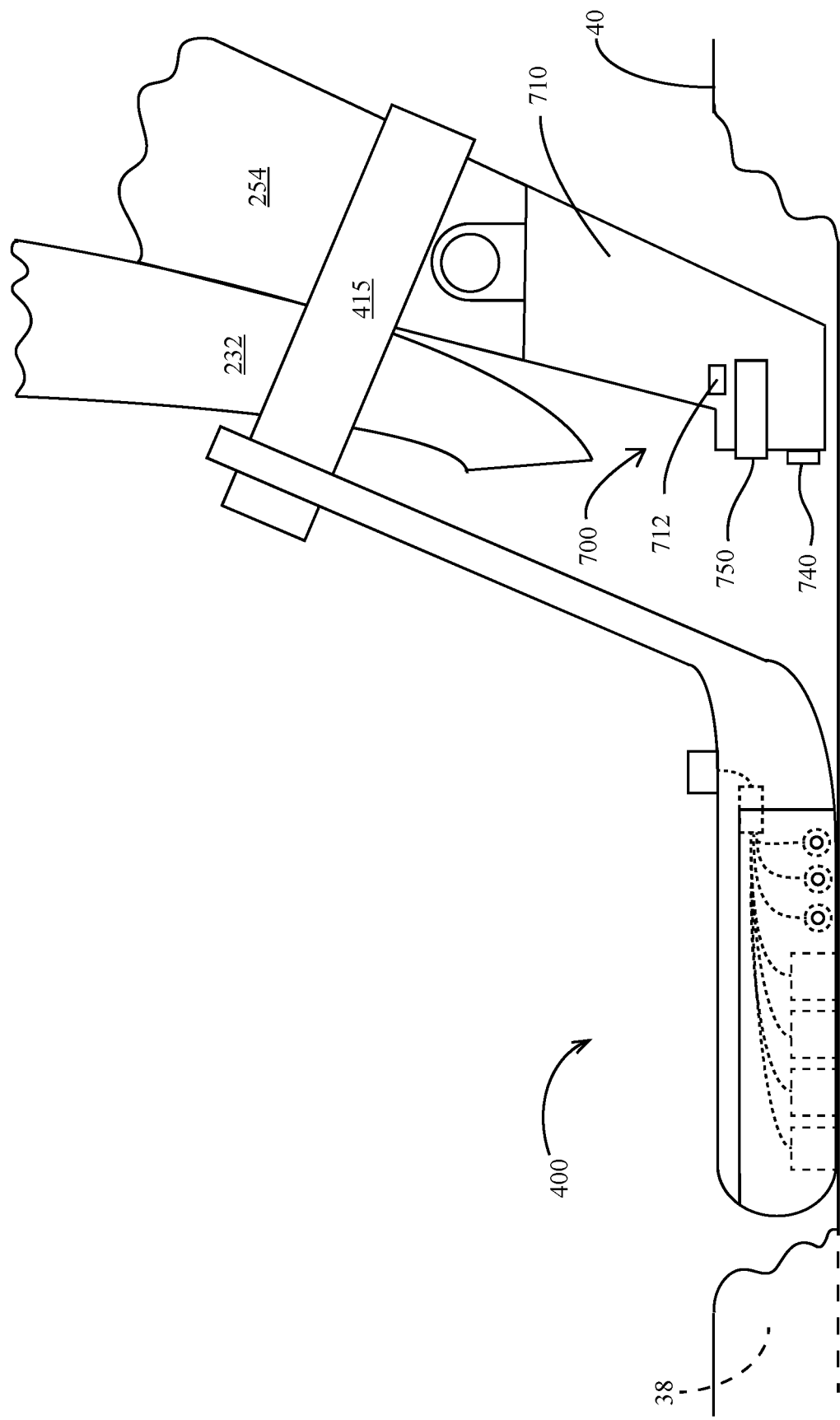
FIG. 7 illustrates a partial view of row unit incorporating an embodiment of an image capture apparatus.

Turning to FIG. 7, an image capture apparatus 700 is illustrated incorporating a camera 750 mounted to an extension 710. In one embodiment, extension 710 may be a guard and/or scraper (also known as a frog), which is used to keep opening discs 244 spread and/or to clean dirt from opening disc 244. The extension 710 may be removably mounted to a portion of the row unit such as a lower end of the shank 254 or to bracket 415. The camera 750 may be oriented to capture an image of the trench, and may be oriented rearward (e.g., opposite the direction of travel) and disposed at least partially inside the trench 38 (e.g., at least partially below the surface). It should be appreciated that the camera 750 is mounted forward of the closing assembly 236 and rearward of a leading edge of the opening discs 244 (e.g., at least partially laterally between the opening discs). In embodiments in which the camera 750 is adjacent to the opening discs 244, one or more wear-resistant guards 712 (comprised, e.g., of tungsten carbide or other wear-resistant material) may be mounted to either side of the extension 710 and may extend laterally outward such that their laterally terminal ends are disposed between the camera 750 and the opening discs 244 to protect the camera from contact with the opening discs. Alternatively, wear-resistant guards 712 may be mounted on either side of camera 750 on extension 710 and oriented parallel to the direction of travel and have a thickness such that camera 750 is not in contact with opening discs 244 or trench 38. A light source 740 (e.g., an LED) may be mounted to the extension 710 and disposed to illuminate the trench 38 and/or soil surface 40 to improve the quality of image capture. The image or images captured by the camera 750 may include the sidewalls of the trench, the bottom of the trench and/or the upper surface of the soil surface 40. The camera may be disposed forward of the seed firmer 400 as illustrated and may be disposed to capture an image of seeds. The camera 750 may be a video camera and/or a still image camera and may be in data communication with the implement monitor 50 for transmission of images to the implement monitor for display to the user and/or association with a location (e.g., geo-referenced location) in the field at which the images are captured and for storage in memory of the implement monitor 50 and/or on a remote server.

Figure 8:
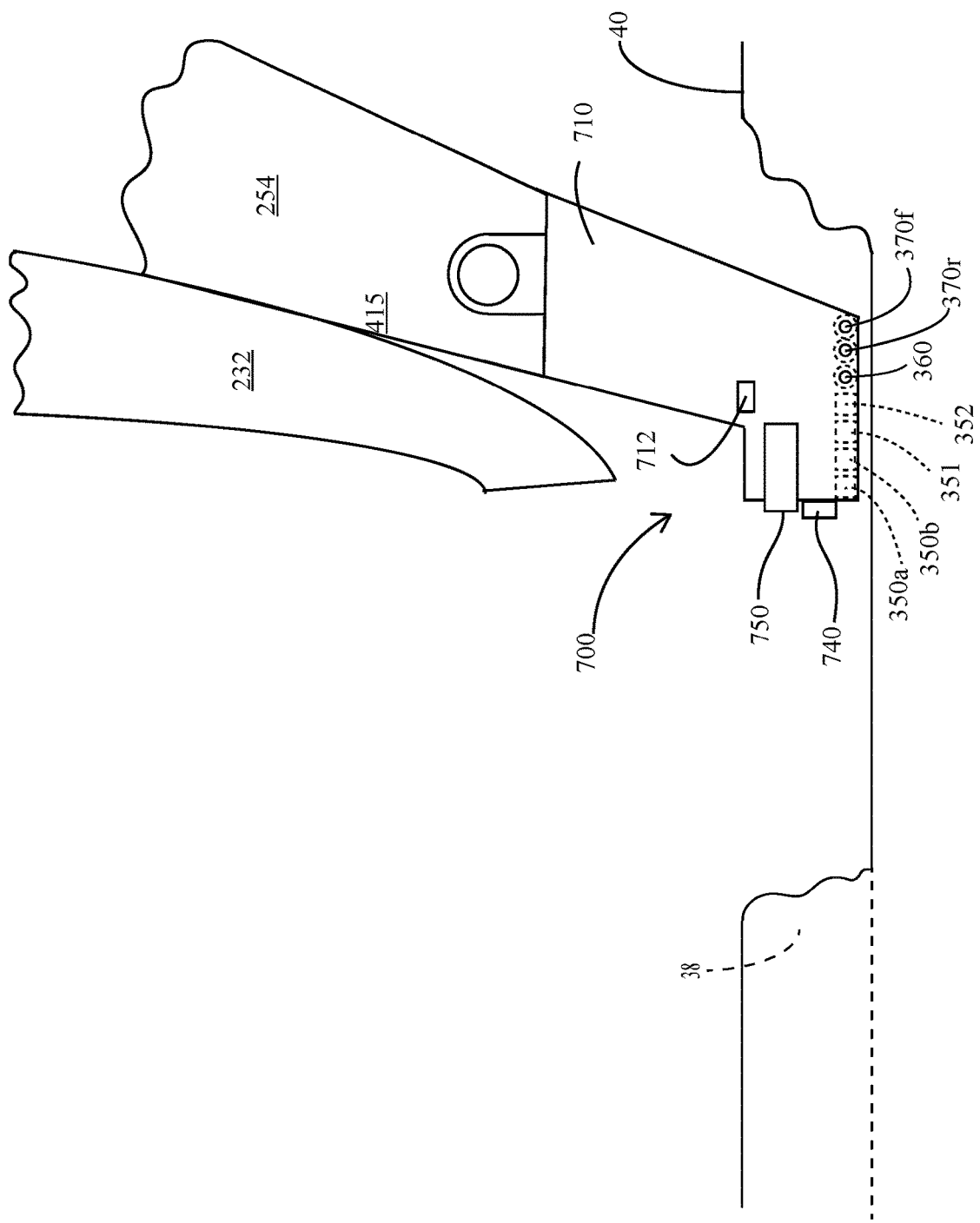
FIG. 8 is a side elevation view of an embodiment of a shank extension incorporating sensors and an image capture apparatus.

In an alternative embodiment as shown in FIG. 8, any of the sensors (e.g., 350, 351, 352, 360, and/or 370) described as being disposed on the seed firmer type soil engaging component 400 may be disposed on soil engaging component comprising a shank extension 710. The sensors may be mounted on the side of the extension 710 to be in contact with the sidewalls of trench 38, or the sensors may be mounted on the bottom of the extension 710 to be in contact with the bottom of trench 38. It should be appreciated that pairs of the multiple sensors 350, 351, 352, 360, 370 may be disposed vertically on the extension 710 (not shown) to provide measurements at different depths in the seed trench 38. The multiple sensors may be used on extension 710 in conjunction with camera 750 or without the camera 750.

The benefit of disposing the sensors on extension 710 is that signal variation generated by a seed as firmer 400 passes over the seed does not need to be subtracted out of the signal. This simplifies the processing of the signal especially when seeds are planted close together, such as with soybeans. Also, the sidewalls of trench 38 are smoother than the bottom of trench 38, which results in less signal variability, which also simplifies the processing of the signal. Also, when sensors are mounted on extension 710, a greater force can be applied so that the sensor has an increased soil contact for increased measurement. As can be appreciated, the firmer 400 has a maximum force that can be applied based on seed to soil contact in given soil conditions so that the seed is planted at a desired depth with desired seed to soil contact and/or to prevent movement of seeds. Also, the extension 710 may better protect the sensor and/or camera from rocks during planting as compared to a firmer 400.

Figure 9:
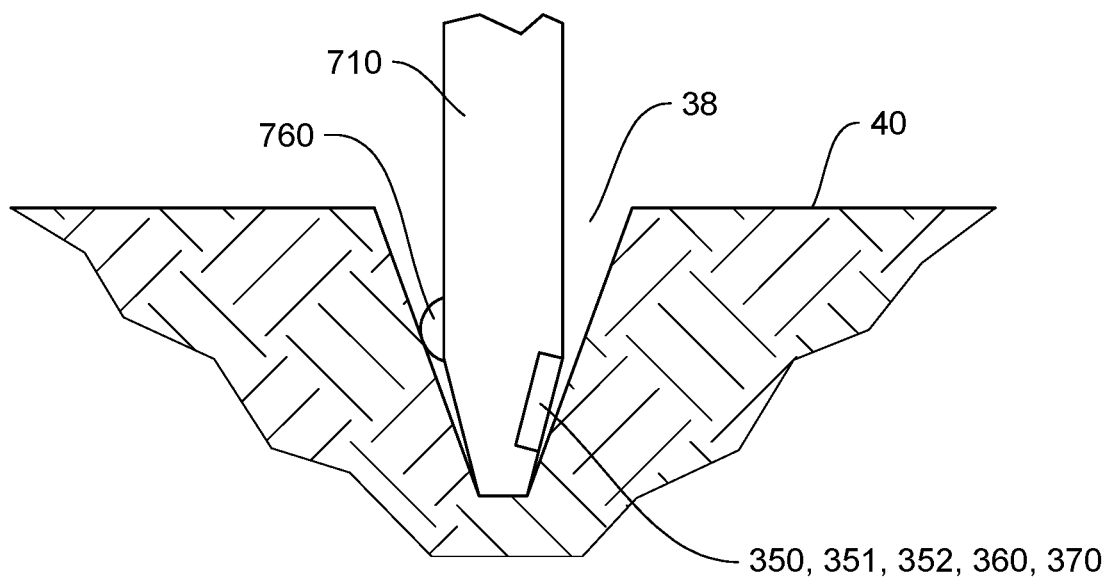
FIG. 9 is an elevation view of the shank extension of FIG. 8 showing a biasing member.
Figure 10:
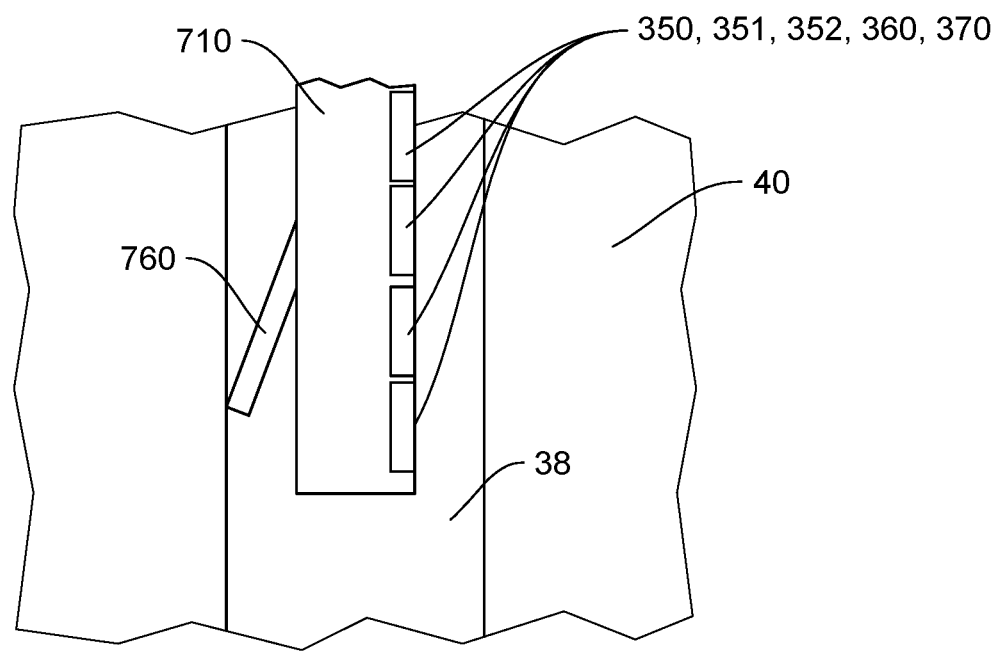
FIG. 10 is a top partial plan view of the shank extension of FIG. 8 showing an alternative embodiment of a biasing member.

The extension 710 may include a biasing member 760 (FIGS. 9-10) disposed to bias the extension in contact with the sidewalls of the trench 38 to provide a more consistent engagement with the soil and thus a more uniform signal by minimizing side-to-side movement of the extension 710 within the trench 38. Examples of various types of biasing members 760 may include, but are not limited to, a wing bump, such as shown in FIG. 9, or a whisker, wishbone or lever spring, such as shown in FIG. 10. The biasing member 760 may also be disposed between extension 710 and camera 750 and wear-resistance guards 712 to keep the wear-resistance guards 712 in contact with trench 38 and to keep the camera lens clean from accumulating dirt. In these embodiments, extension 710 acts as a stop for the sensor and/or camera. Alternatively, biasing members 760 may be disposed on the side of the seed firmer 400 (not shown).

It should be appreciated that if the extension 710 is a guard/scraper, the frictional forces between opening discs 244 and extension 710 may generate heat due to friction, which may cause the extension to approach 150° C. Accordingly, thermal insulation may be desirable between the sensors 350, 351, 352, 360, 370 and the body of the extension 710 to minimize thermal transfer between the body of the extension and the sensors disposed therein or thereon.

Figure 11:
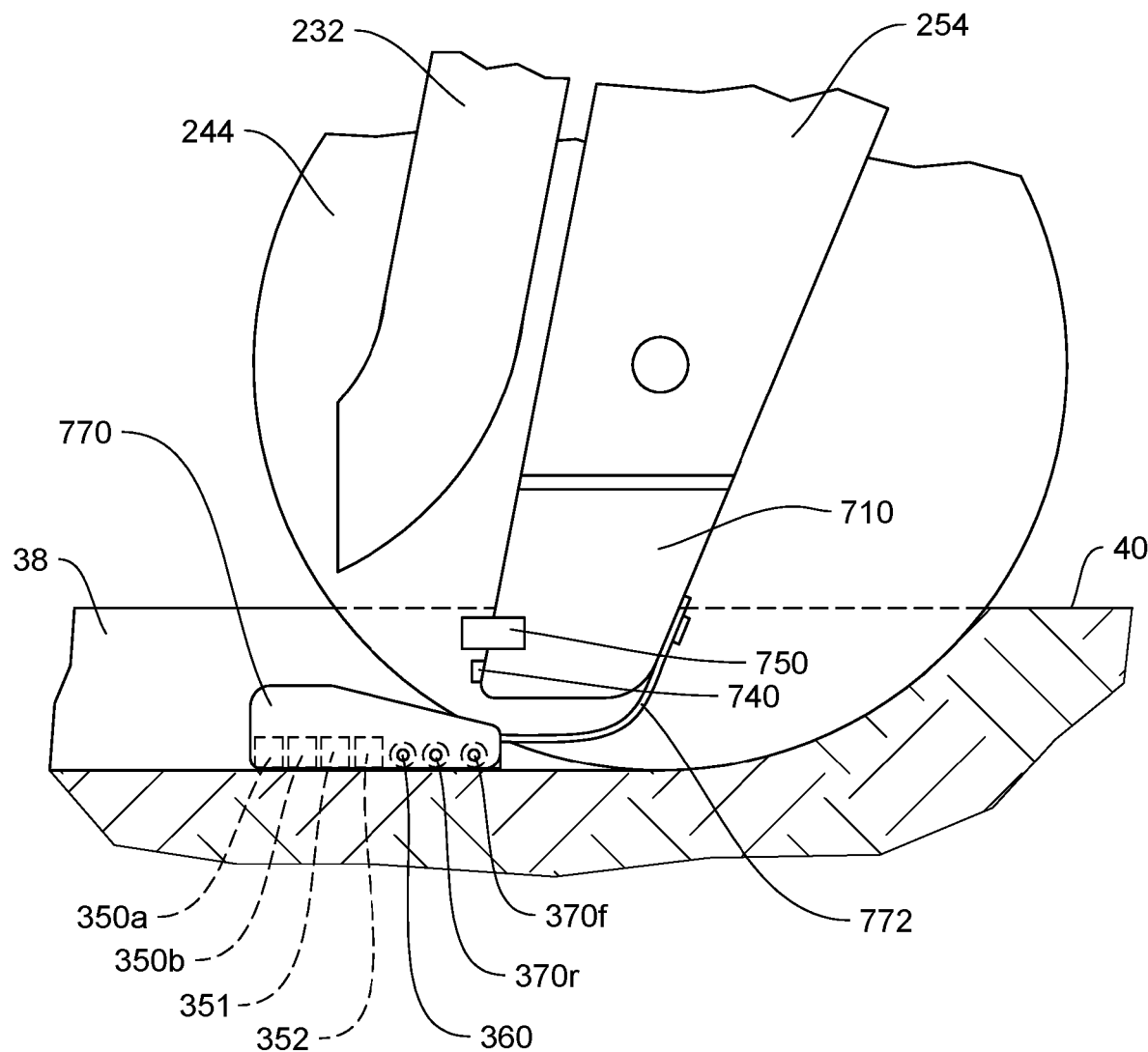
FIG. 11 is a side elevation view of a trailing member with sensors in combination with a shank extension with an image capture apparatus.

In yet another alternative embodiment, as shown in FIG. 11, the sensors 350, 351, 352, 360, 370 may be disposed on the bottom or sidewalls of a soil engaging component comprising a trailing member 770 secured to the shank 254 or to the shank extension 710 by a resilient arm 772 such that it is below and rearward of the shank 254 or extension 710, but forward of the trajectory of the seeds being deposited by the seed tube. Alternatively, the resilient arm 772 may be a living hinge (not shown). The resilient arm 772 biases the trailing member 770 into the bottom of the seed trench 38 to ensure consistent and uniform contact with the soil. Additionally, the trailing member 770 may incorporate any of the side biasing members 760 as previously described to minimizing side-to-side movement of the extension 710 within the trench 38 to provide more consistent engagement with the soil and thus a more uniform signal. As shown in FIG. 11, the trailing member 770 is disposed slightly behind opening discs 244 to allow dirt to flow around the trailing member.

Figure 12:
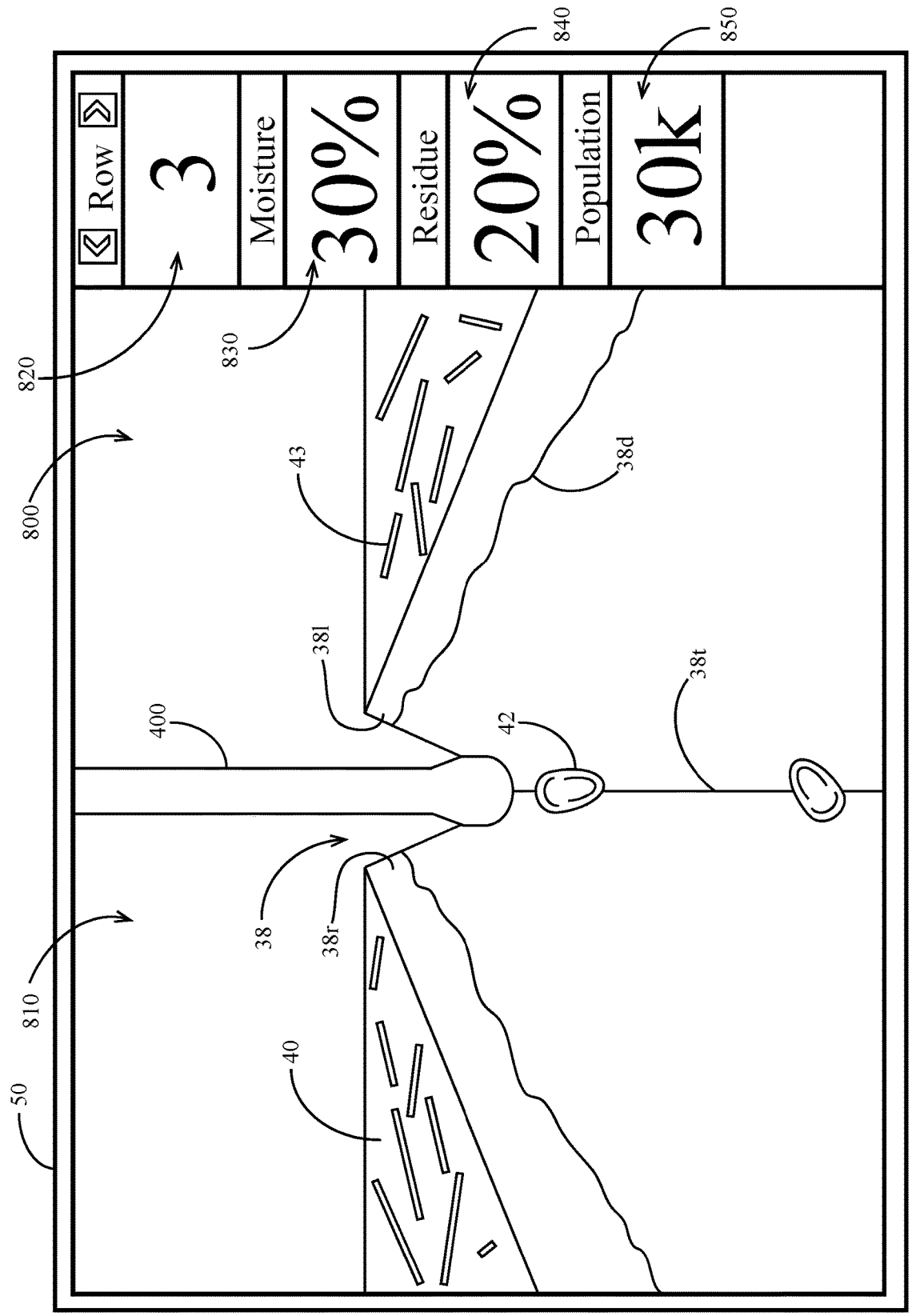
FIG. 12 illustrates an embodiment of a graphical display including an image captured by the image capture apparatus of FIG. 7, 8 or 11.

Turning to FIG. 12, the implement monitor 50 may display a screen 800 including an image 810 (e.g., video or still image) including the soil surface 40, residue 43 on the soil surface, the trench 38, including sidewalls 38r, 38l and trough 38t thereof, and seeds 42 disposed in the bottom of the trench. The screen 800 may include a row identification window 820 which identifies which row is associated with the displayed image. Selecting one of the arrows in the row identification window 820 may command the monitor 50 to load a new screen including an image associated with another, different row of the implement (e.g., captured by a second image capture apparatus associated with that other, different row). The screen 800 may include numerical or other indications of soil or seed data which the monitor 50 may determine by analyzing one or more images 810 or a portion or portions thereof.

Soil data measurement window 830 may display a soil moisture value associated with the soil in the trench 38. The soil moisture value may be based upon an image analysis of the image 810, e.g., the portion of the image corresponding to the sidewalls 38r, 38l. Generally, the image 810 may be used to determine a moisture value by referencing a database correlating image characteristics (e.g., color, reflectivity) to moisture value. To aid in determining the moisture value, one or more images may be captured at one or more wavelengths. The wavelengths may be selected such that a statistical correlation strength of image characteristics (or an arithmetic combination of image characteristics) with moisture at one or more wavelengths is within a desired range of correlation strength. A wavelength or amplitude of light waves generated by the light source 740 may also be varied to improve image quality at selected image capture wavelengths or to otherwise correspond to the selected image capture wavelengths. Alternatively, a soil moisture value may be based upon capacitive moisture from sensor 351 or soil moisture tension from electronic tensiometer sensor 352. In some implementations, the trench may be divided into portions having different estimated moistures (e.g., the portions of the sidewall 381 above and below the moisture line 38d) and both moistures and/or the depth at which the moisture value changes (e.g., the depth of moisture line 38d) may be reported by the screen 800. It should be appreciated that the moisture values may be mapped spatially using a map similar to the map shown in FIG. 6. It should be appreciated that a similar method and approach may be used to determine and report soil data other than moisture (e.g., soil temperature, soil texture, soil color) based on one or more captured images.

Agronomic property window 840 may display an agronomic property value (e.g., residue density, trench depth, trench collapse percentage, trench shape) which may be estimated by analysis of the image 810. For example, a residue density may be calculated by the steps of: (1) calculating a soil surface area (e.g., by identifying and measuring the area of a soil surface region identified based on the orientation of the camera and the depth of the trench, or based on the color of the soil surface); (2) calculating a residue coverage area by determining an area of the soil surface region covered by (e.g., by identifying a total area of the soil surface covered by residue, where residue may be identified by areas having a color lighter than a constant threshold or more than a threshold percentage lighter than an average color of the soil surface region); and (3) dividing the residue coverage area by the soil surface area.

Planting criterion window 850 may display a planting criterion such as seed spacing, seed singulation, or seed population. The planting criterion may be calculated using a seed sensor and the algorithms disclosed in U.S. Pat. No. 8,078,367, the disclosure of which is hereby incorporated herein by reference in its entirety. In some implementations, algorithms similar to those disclosed in U.S. Pat. No. 8,078,367 may be used in conjunction with a distance between seeds calculated with reference to the image 810. For example, the monitor 50 may: (1) identify a plurality of seeds in the image 810 (e.g., by identifying regions of the image having a range of colors empirically associated with seeds); (2) identify one or more image distances between adjacent seeds (e.g., by measuring the length of a line on the image between the centroids of the seeds); (3) convert the image distances to "real space" distances using a mathematical and/or empirical relationship between distances extending along the trench in the image and corresponding distances extending along the actual trench; (4) calculate a planting criterion (e.g., seed population, seed spacing, seed singulation) based on the "real space" distances and/or the image distances.

Figure 13:
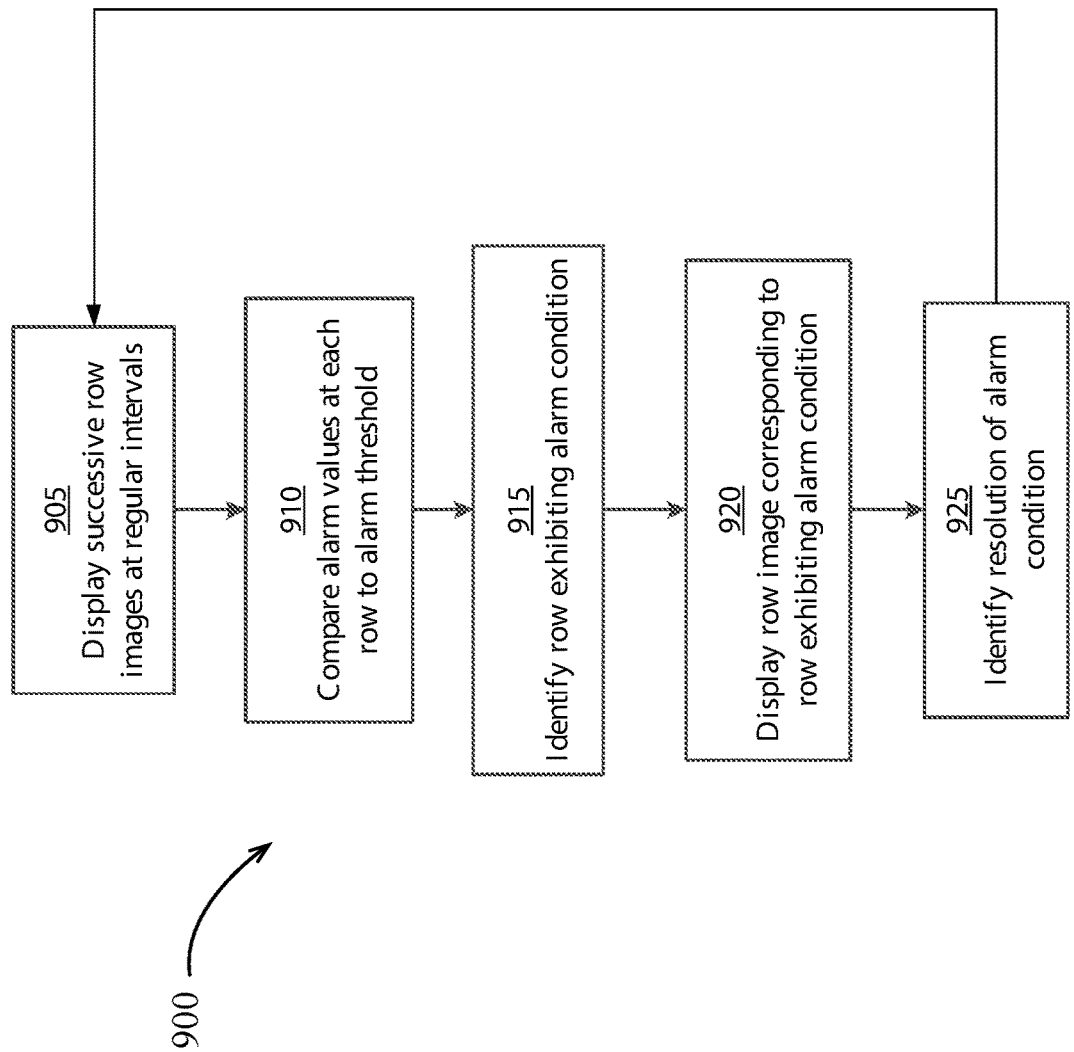
FIG. 13 illustrates an embodiment of a row image selection process.

Turning to FIG. 13, an exemplary process 900 for selecting a row image to display on the screen 800 is illustrated. It should be appreciated that because multiple row units may incorporate an image capture apparatus, it may be undesirable to simultaneously display images from all such row units. Instead, at step 905, the monitor 50 may display successive row images (i.e., still or video images captured by successive row units) by displaying a new row image a regular interval (e.g., 10 seconds, 30 seconds, one minute). For example, a first still image or video stream from a first image capture apparatus at a first row unit may be displayed until the expiration of a first regular interval, whereupon a second still image or video stream from a second image capture apparatus at a second row unit may be displayed until the expiration of a second regular interval. Step 910 may be carried out simultaneously with step 905. At step 910 the monitor 50 may compare an alarm value at each row unit to an associated alarm threshold. The alarm value may correspond to a soil measurement value (e.g., soil moisture, soil temperature soil texture, soil color, soil reflectivity, soil reflectivity variation) which may be estimated based on analysis of the row image or measured by another soil characteristic sensor associated with the row unit. The alarm value may correspond to an agronomic property or planting criterion (e.g., residue density, trench collapse, trench shape, trench depth, seed spacing, seed singulation, seed population, fertilizer flow rate) which may be estimated based on analysis of the row image or measured by another agronomic property sensor (such as a seed sensor, fertilizer flow rate sensor, trench depth sensor). The alarm threshold may comprise a selected constant value of the alarm value or a statistical function (e.g., one or more standard deviation above or below the mean or average) of the alarm value reported to the monitor during a preceding period or during operation in a specified area (e.g., 30 seconds, 30 feet of travel, the entire field associated with the operation). At step 915, the monitor 50 identifies a row exhibiting an alarm condition (e.g., at which the alarm value has exceeded the alarm threshold). At step 920, the monitor 50 displays (e.g., on the screen 800) the row image captured by the image capture apparatus associated with the row unit exhibiting the alarm condition. The monitor 50 may optionally indicate a graphical representation of the alarm condition adjacent to the row image, e.g. in a separate window indicating the alarm or by adding an attention-drawing indication (e.g., a red border) to a window (e.g., soil data measurement window 830, agronomic property window 840). At step 925, the monitor 50 identifies a resolution of the alarm condition (e.g., by enabling the user to cancel the alarm or by determining that the alarm condition is no longer active) and returns to step 905.

In one embodiment, the depth of planting may be adjusted based on soil properties measured by the sensors and/or camera so that seeds are planted where the desired temperature, moisture, and/or conductance is found in trench 38. A signal may be sent to the depth adjustment actuator 380 to modify the position of the depth adjustment rocker 268 and thus the height of the gauge wheels 248 to place the seed at the desired depth. In one embodiment, an overall goal is to have the seeds germinate at about the same time. This leads to greater consistency and crop yield. When certain seeds germinate before other seeds, the earlier resulting plants can shade out the later resulting plants to deprive them of needed sunlight and may disproportionately take up more nutrients from the surrounding soil, which reduces the yield from the later germinating seeds. Days to germination is based on a combination of moisture availability (soil moisture tension) and temperature.

In one embodiment, moisture may be measured by volumetric water content or soil moisture tension. The depth may be adjusted when a variation exceeds a desired threshold. For example, the depth may be adjusted deeper when the volumetric water content variation is greater than 5% or when the soil moisture tension variation is greater than 50 kPa.

In another embodiment, the depth of planting may be adjusted until good moisture is obtained. Good moisture is a combination of absolute and moisture variation. For example, good moisture exists when there is greater than 15% volumetric water content or soil moisture tension and less than 5% variation in volumetric water content or soil moisture tension. A good moisture may be greater than 95%.

In another embodiment, a data table may be referenced for combinations of moisture and temperature and correlated to days to emergence. The depth may be controlled to have a consistent days to emergence across the field by moving the depth up or down to combinations of temperature and moisture that provide consistent days to emergence. Alternatively the depth may be controlled to minimize the days to emergence.

In another embodiment, the depth may be adjusted based on a combination of current temperature and moisture conditions in the field and the predicted temperature and moisture delivery from a weather forecast. This process is described in U.S. Patent Publication No. 2016/0037709, which is hereby incorporated herein by reference in its entirety.

In any of the foregoing embodiments for depth control for moisture, the control may be further limited by a minimum threshold temperature. A minimum threshold temperature (for example 10° C. (50° F.)) may be set so that the planter will not plant below a depth where the minimum threshold temperature is. This may be based on the actual measured temperature or by accounting for the temperature measured at a specific time of day. Throughout the day, soil is heated by sunshine or cooled during night time. The minimum threshold temperature may be based on an average temperature in the soil over a 24 hour period. The difference between actual temperature at a specific time of day and average temperature may be calculated and used to determine the depth for planting so that the temperature is above a minimum threshold temperature.

The soil conditions of conductivity, moisture, temperature, and/or reflectance may be used to directly vary planted population (seeds/acre), nutrient application (gallons/acre), and/or pesticide application (lb./acre) based off of zones created by organic matter, soil moisture, and/or electrical conductivity.

In another embodiment, any of the sensors or camera may be adapted to harvest energy to power the sensor and/or wireless communication. As the sensors are dragged through the soil, the heat generated by soil contact or the motion of the sensors may be used as an energy source for the sensors.

Depth Measurement and Moisture Characterization

Figure 14A:
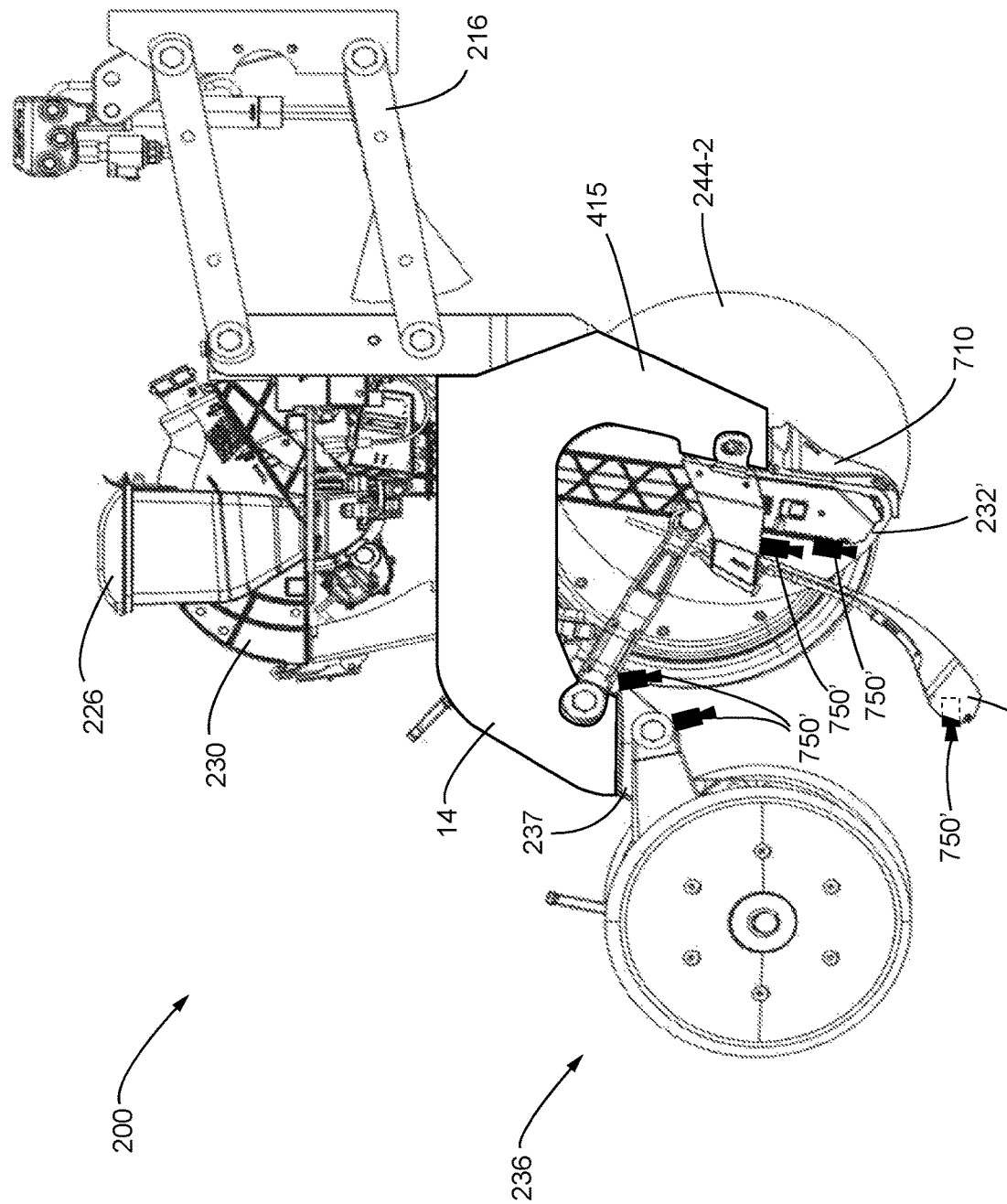
FIG. 14A illustrates a side elevation view of an embodiment of a time of flight camera at various locations on a row unit.

In another embodiment illustrated in FIG. 14A, the depth of seed trench 38 and/or a depth of a seed 42 in seed trench 38 may be measured by selecting a time of flight camera 750' as camera 750. While the location of the camera 750 on extension 710 may be used for the time of flight camera 750', disposing a time of flight camera 750' on the row unit 200 above the seed trench 38 will additionally provide information about the sides of the seed trench 38. A time of flight camera provides distances to objects that are in the images that are captured by the time of flight camera.

Figure 14B:
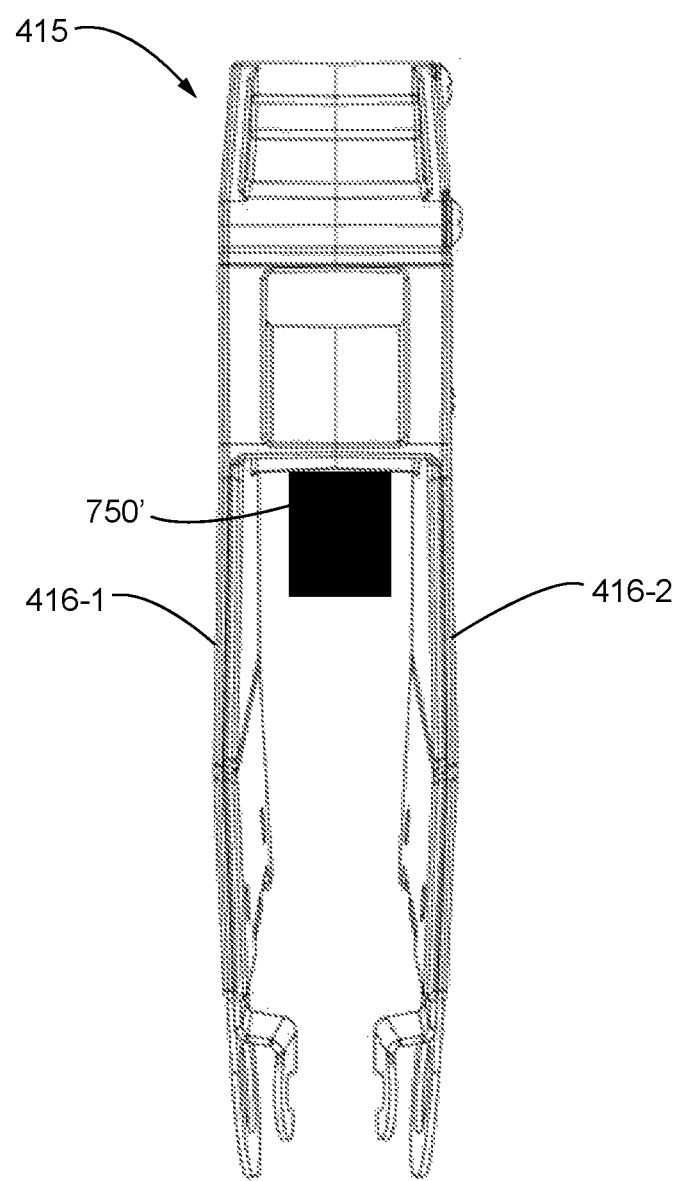
FIG. 14B illustrates a top plan view of the bracket from FIG. 14A with the time of flight camera disposed in the middle of the bracket.

FIG. 14A illustrates possible, alternative, locations for the time of flight camera 750' on row unit 200 disposed over seed trench 38. In one location, the time of flight camera 750' may be disposed on seed tube 232, or as shown, on the seed conveyor 232'. In another location, the time of flight camera 750' may be disposed on the bracket 415. In another location, the time of flight camera 750' may be disposed on the on bracket 237 of the closing assembly 236, which connects to frame 14. In another location, the time of flight camera 750' may be disposed on the frame 14 ahead of the closing assembly 236. In another location, the time of flight camera 750' may be disposed in the seed firmer 400'. As illustrated in FIG. 14B, bracket 415 is the bracket disclosed in U.S. Pat. No. 8,794,164 having a first side 416-1 and a second side 416-2. the time of flight camera 750' may be disposed between first side 416-1 and second side 416-2 of the bracket 415. The time of flight camera 750' may be in data communication with the implement monitor 50 for transmission of images to the implement monitor for display to the user and/or association with a location (e.g., geo-referenced location) in the field at which the images are captured and for storage in memory of the implement monitor and/or on a remote server. Examples of the time of flight camera 750' include, but are not limited to, Texas Instruments OPT8241 or OPT8320 time of flight cameras. In addition to capturing RGB color information, the time of flight cameras capture XYZ coordinates for each pixel (known as voxel). The XYZ coordinates for the seed trench 38, seed 42, residue 43, or dry soil 1703 can be captured and used to determine distance. Depending on placement of the time of flight camera 750' on row unit 200, the time of flight camera 750' may be offset from being directly over the seed trench 38 when equipment, such as seed firmer 400', is in the field of view.

Figure 15:
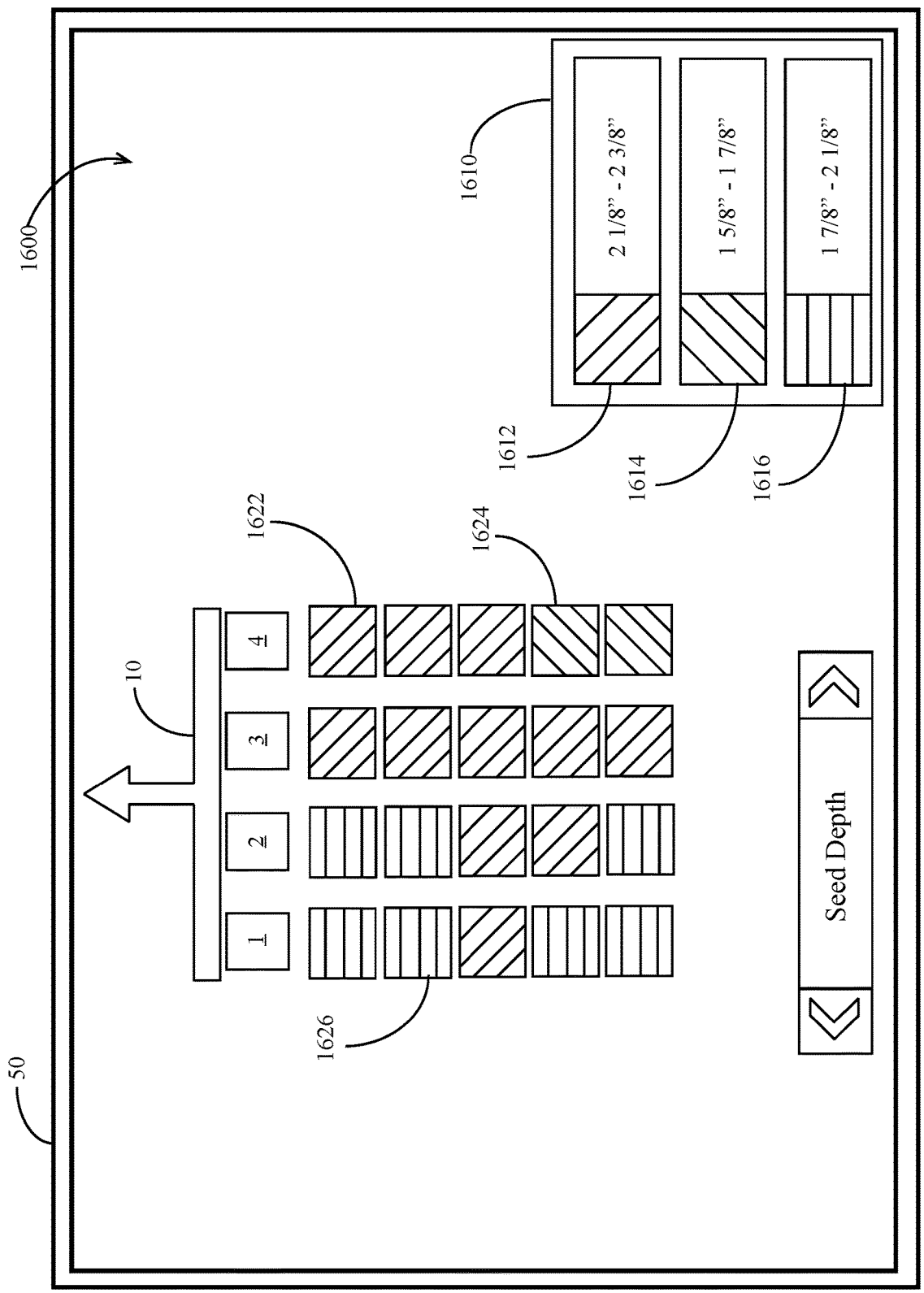
FIG. 15 illustrates an embodiment of a graphical display including a spatial map of seed depth.

The images captured by the time of flight camera 750' may provide a cross sectional view of seed trench 38. Distance measuring software may measure a distance from the top of the seed trench 38 to the bottom of the seed trench 38 to provide a depth of the seed trench 38. Images captured by the time of flight camera 750' may also capture the placement of seeds in the seed trench 38 to confirm whether seeds are placed in the bottom of the trench, and optionally, whether the seeds are firmed by the seed firmer 400'. A depth of the seed in the seed trench 38 may be measured. Referring to FIG. 15, the seed depth may be displayed spatially on a seed depth map 1600 displayed (e.g., on the implement monitor 50 or remote computer). Areas of the field may be associated with graphical representations 1622, 1624, 1626 (e.g., pixels or blocks) associated by color or pattern with subsets 1612, 1614, 1616, respectively of a legend 1610. The subsets may correspond to numerical ranges of seed depth. The numerical ranges may be scaled based on a selected depth for seed planting. Different types of seeds may be planted at different depths. In an embodiment, the color green may be associated with a seed planted at the selected depth, and other colors may be used to represent a depth shallower or deeper than the selected depth.

A benefit to positioning the time of flight camera 750' on the row unit 200 and looking down onto seed trench 38 is that the top of seed trench 38 may be viewed to determine whether there is any residue at the top of the seed trench 38 or adjacent to the seed trench 38. Also, any dry soil from outside of the seed trench 38 or from the top of the seed trench 38 that is caving in onto the seed may be viewed.

Figure 16A:
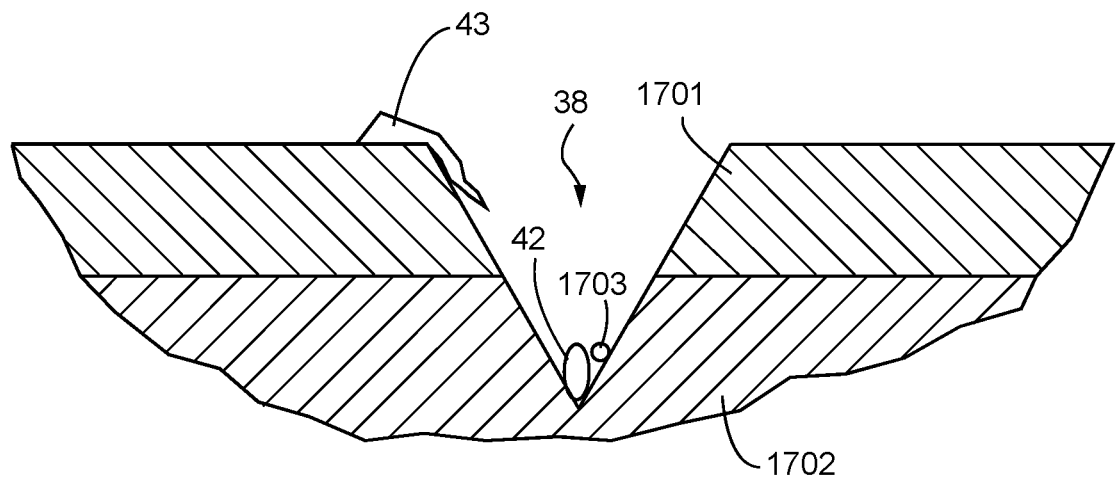
FIG. 16A illustrates a cross-sectional view of a seed trench.
Figure 16B:
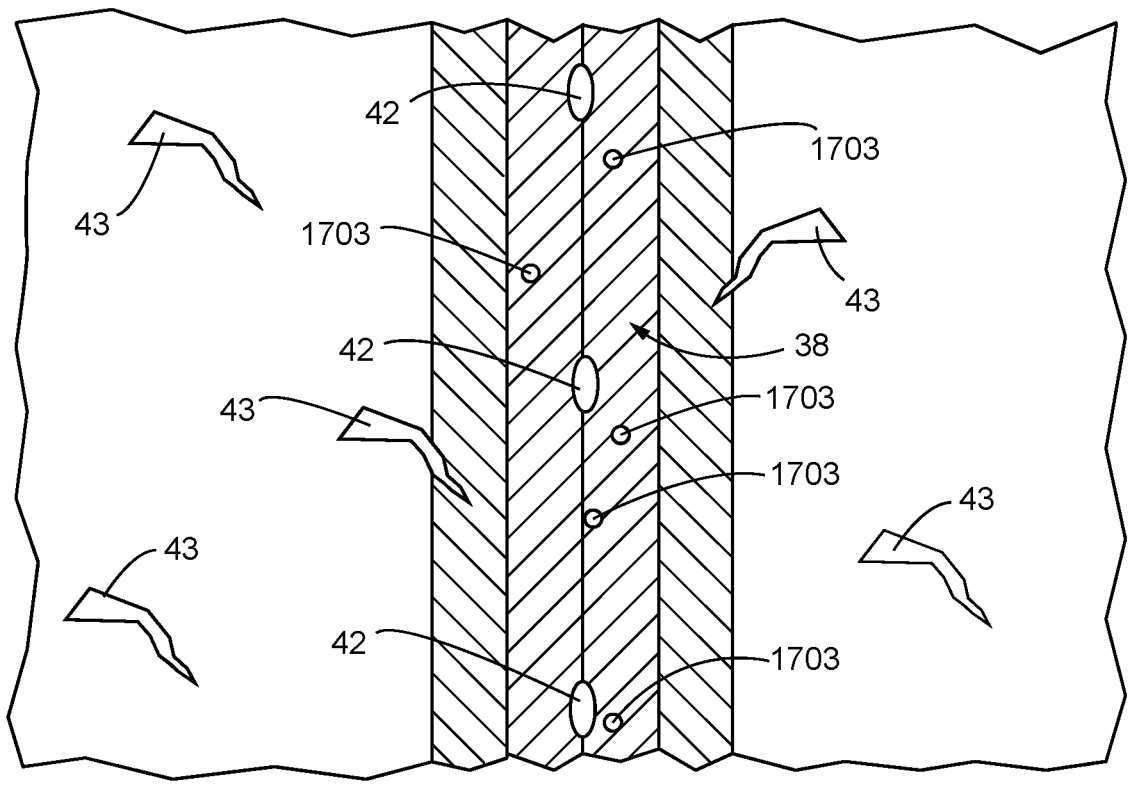
FIG. 16B is a top view of the seed trench of FIG. 16A.

Referring to FIGS. 16A and 16B, a trench profile based on soil moisture profile may be displayed based on a color of the soil. Dry soil 1701 has a light color, and moist soil 1702 has a darker color. Also, seed 1705 placement and depth, crop residue 43, and dry soil 1703 may be displayed. Dry soil 1703 may be dry soil that falls into seed trench 38 from the top of seed trench 38 or from outside of seed trench 38. When the seed 42 is not in moist soil 1702, the above described depth adjustment may be made to increase depth until seed 42 is in moist soil 1702. If there is sufficient moist soil 1702, then depth may be decreased to a selected depth.

In another embodiment, tracking the placement of seeds 42 with the time of flight camera 750' may provide a seed pulse similar to the seed pulse described in International Patent Publication No. WO2015/171915, which is hereby incorporated herein by reference in its entirety. This seed pulse may be used to track "good spacing", or the seed pulse may be used with pulsing a valve (not shown), such as is described in U.S. Pat. No. 7,370,589, which is hereby incorporated herein by reference in its entirety, to place fluid on or adjacent to a seed. The image from the time of flight camera 750' may detect a seed in the image, and the processor may generate a seed pulse. The processor may then send a signal to the valve to selectively open and close to place fluid on or adjacent to the seed.

In another embodiment, when residue and/or dry soil from the top of the seed trench or outside of the seed trench is detected as being present in the seed trench 38 or on the seed 42, the row cleaner 12 may be adjusted to increase debris removal by increasing the downforce applied to the actuator 201. An image from the camera 750 or the time of flight camera 750' may identify residue or dry soil, and a signal may be sent from the processor in the monitor 50 to the actuator 201 to change the downforce.

Figure 17:
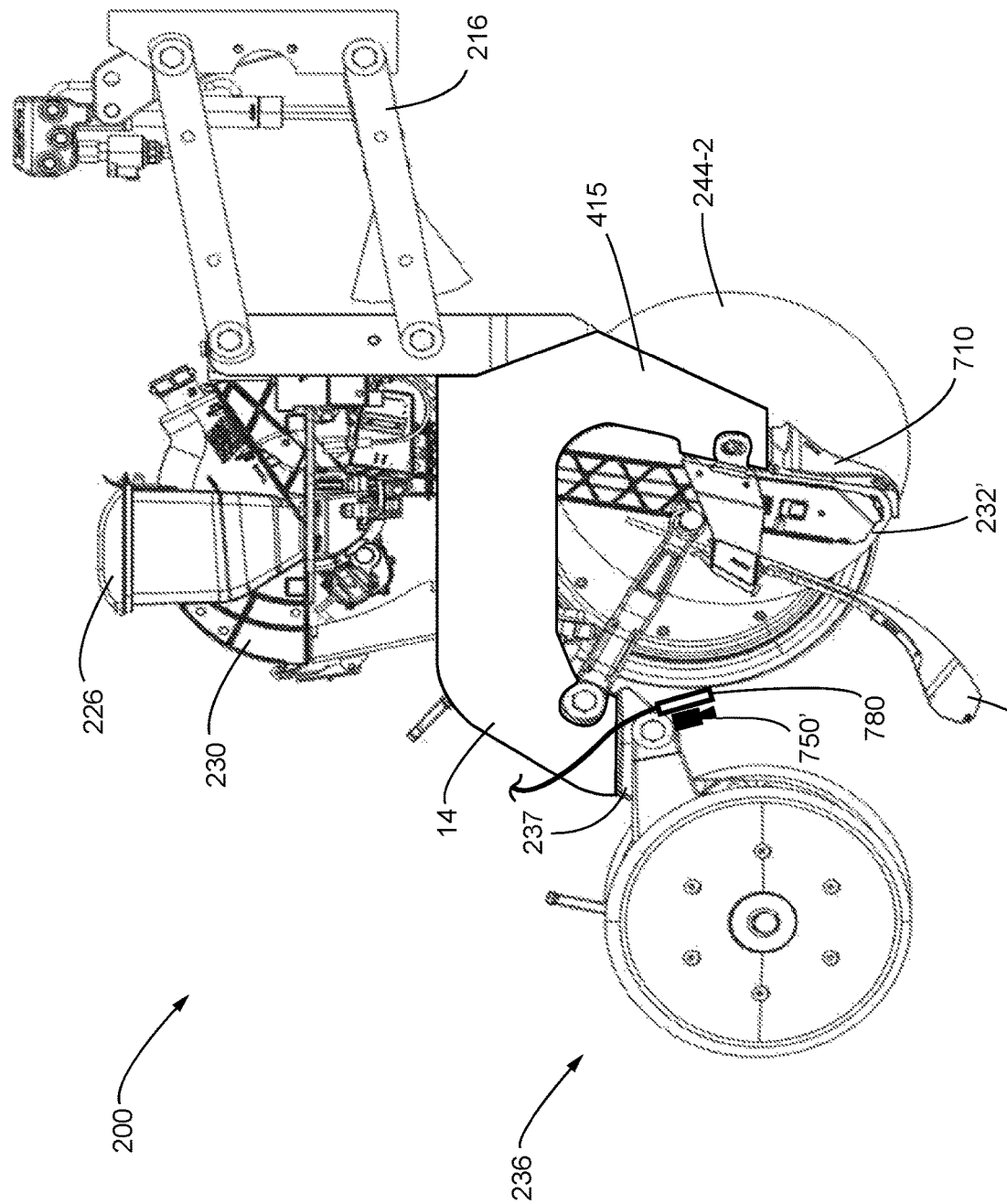
FIG. 17 illustrates a side elevation view of an embodiment of a time of flight camera on a row unit and a gas source.

In another embodiment as illustrated in FIG. 17, a gas dispenser 780 may be disposed on row unit 200 proximate to the time of flight camera 750' to propel a gas stream into the field of view of the time of flight camera 750' to expel any dust or debris that is in the field of view to provide an unobstructed view of the seed trench 38. The gas dispenser 780 may be in fluid communication with a gas source, such as air (not shown). The gas dispenser may have a nozzle (not shown) for changing the dispersal of gas.

Figure 18:
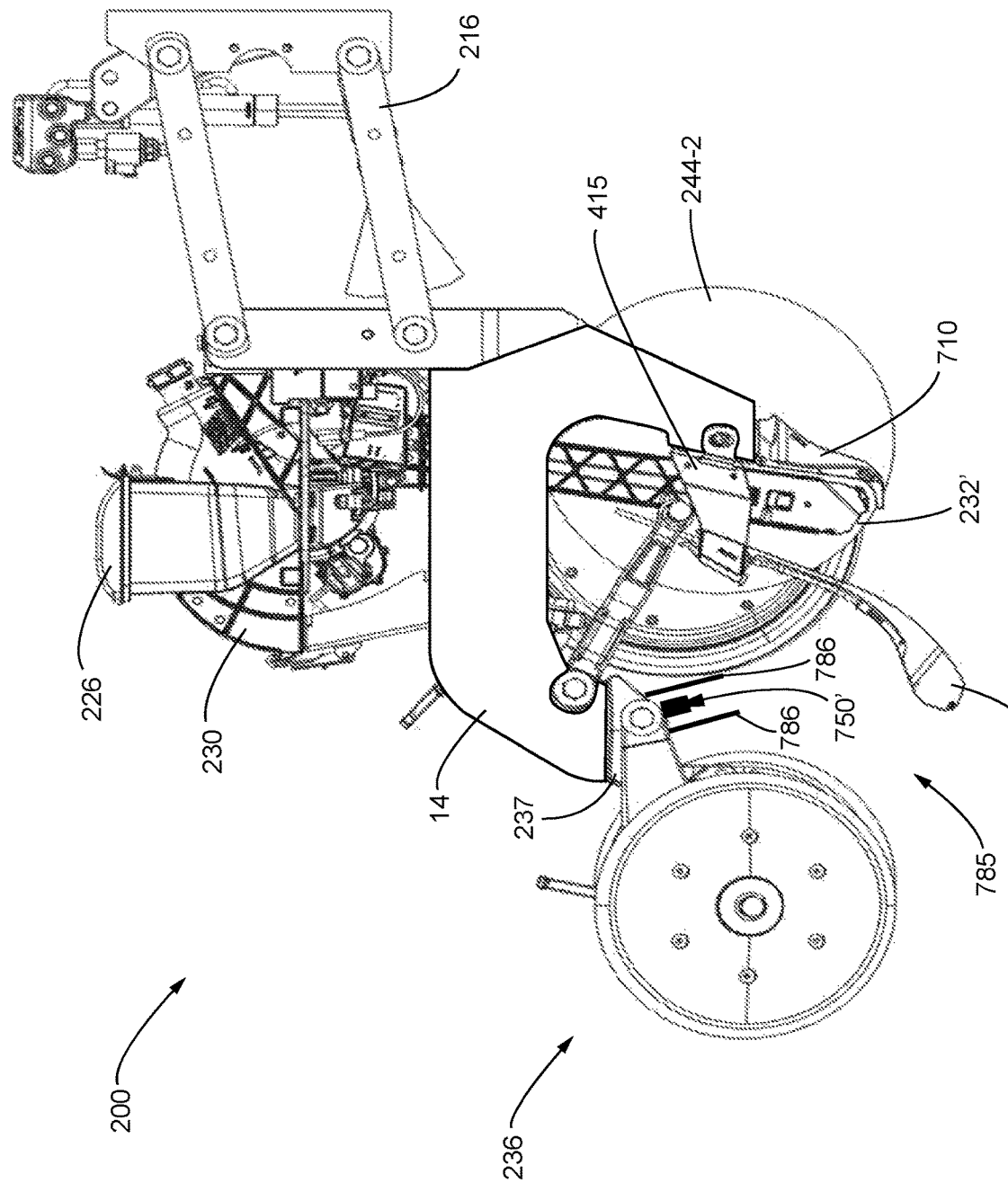
FIG. 18 illustrates a side elevation view of an embodiment of a time of flight camera on a row unit and an electrostatic charging system.

The time of flight camera 750' may have an electrostatic coating on its lens to repel dust. Also, the time of flight camera 750' may have a hydrophobic coating to repel any buildup on the time of flight camera 750'. In another embodiment as illustrated in FIG. 18, an electrostatic charging system 785 may be disposed proximate to the time of flight camera 750' to impart an electrostatic charge to dust particles to then be repelled by the electrostatic coating on the time of flight camera 750'. Electrostatic charging system 785 may have one or more rods 786 to provide the electrostatic charge to the dust particles. Instead of a rod shape, rods 786 may have any other shape, such as a plate shape.

Figure 19:
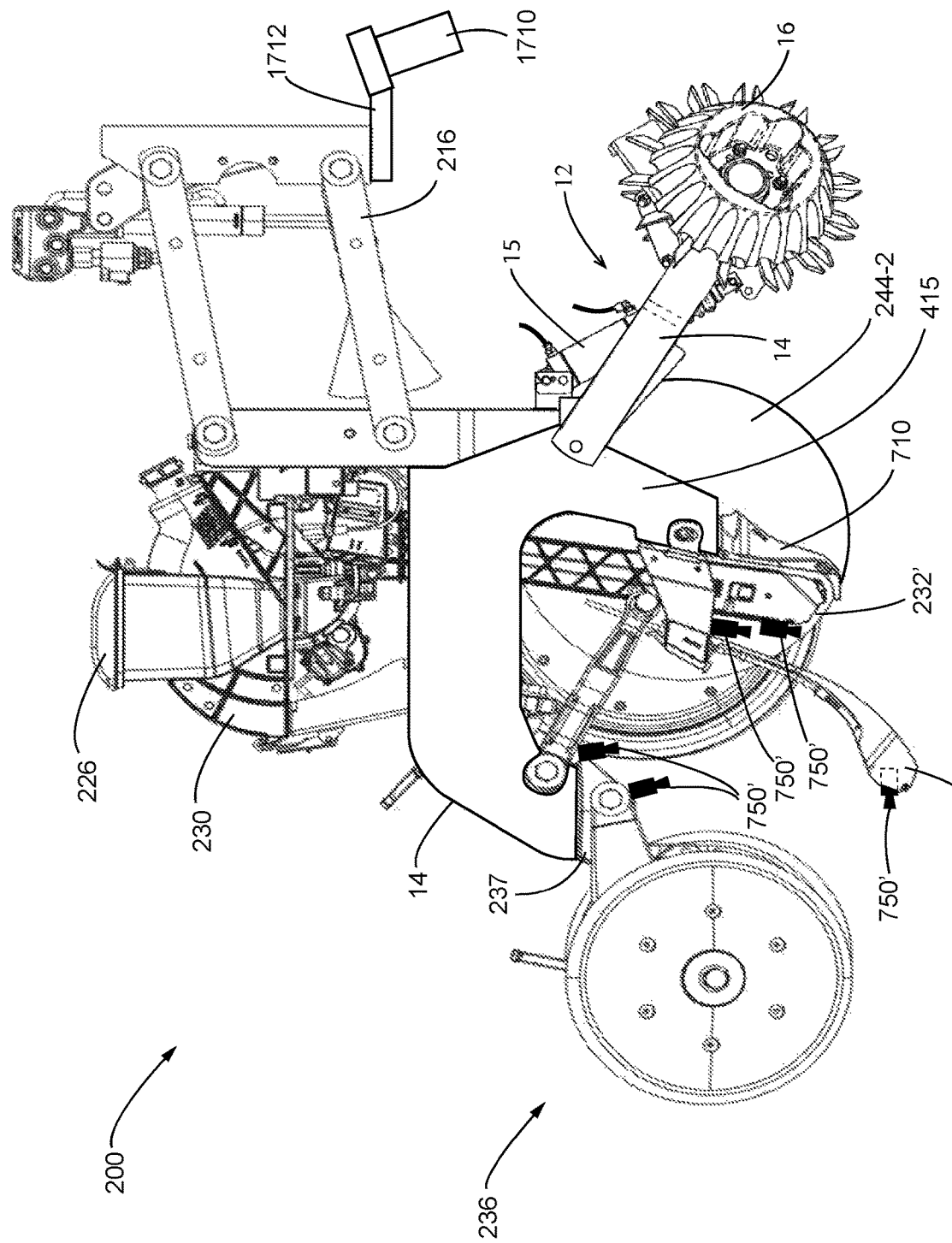
FIG. 19 illustrates a side elevation view of an embodiment of a row unit with a sensor disposed forward of the row cleaner to detect soil mounds and a camera rearward of the opening assembly to identify the lateral trench formed by the row cleaner.
Figure 20:
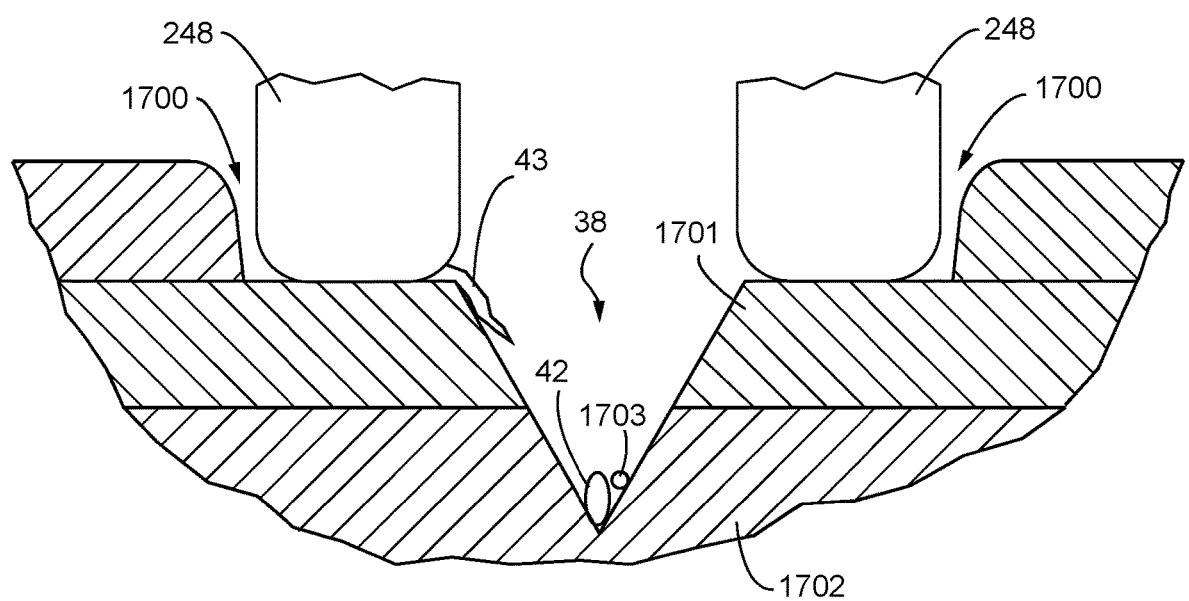
FIG. 20 is a cross-sectional view similar to FIG. 16A showing the seed trench and showing the lateral trench formed by the row cleaner.

FIG. 19 is another side view of a row unit similar to FIG. 14A, but showing a row cleaner assembly 12 mounted to the forward end of the row unit 200. The row cleaner assembly 12 is the same as described above in connection with FIG. 2. It should be appreciated that if there is too much downpressure being applied by the row cleaner actuator 15, the row cleaner wheels 16 may act too aggressively, forcing too much soil laterally to either side forward of the trench opening assembly 234 and producing an undesirable "extra trench". For example, FIG. 20 is intended to represent a cross-section of the soil (similar to FIG. 16A) looking in the direction of travel just rearward of the opening assembly 234. The undesirable "extra trench" 1700 created by the overly aggressive row cleaner 12 is shown extending laterally from each side of the V-shaped trench 38 created by the opening discs 244 (not shown). As the row unit travels forwardly, the gauge wheels 248 will end up rolling within this extra trench 1700, thus unintentionally changing the depth of the trench and improper seed planting depth. To minimize or reduce the length of time in which the undesirable extra trench may be produced, one or more time of flight cameras 750' as described above in connection with FIG. 14A, may be disposed above the seed trench 38 to detect the presence of the extra trench 1700. If the extra trench 1700 is detected, the soil monitoring system 300 (FIG. 3) may automatically retract the row cleaner actuator 15 a sufficient amount to avoid the row cleaner wheels 16 from creating the extra trench 1700.

In addition, as shown in FIG. 19, a sensor 1710 may be supported by a bracket 1712 forward of the row cleaner assembly 12, to detect mounding of dirt in front of the row cleaner wheels 16 to anticipate that an undesirable extra trench 1700 is likely to be formed. If a dirt mound is detected, the soil monitoring system 300 may slightly retract the row cleaner actuator 15 to avoid the creation of the extra trench as the row unit passes over the dirt mound. The sensor 1710 may be a camera, a time of flight camera, radar, ultrasonic, LIDAR, or laser line triangulator. An example of a laser line triangulator is the scanCONTROL 2D/3D laser scan (laser profile scanner) from Micro-Epsilon of Raleigh, North Carolina, USA, as disclosed in published brochure no. 79788353-G021077GKE, incorporated herein by reference.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. An agricultural implement, comprising:
   at least one row unit, each said at least one row unit including an opening assembly and a seed delivery device, the opening assembly configured to open a seed trench in a soil surface and the seed delivery device configured to deposit seed in said open seed trench as the agricultural implement travels in a forward direction of travel;
   a time of flight camera disposed on said at least one row unit to capture images of said open seed trench looking down from above said open seed trench after the seed is deposited in said open seed trench; and
   a processor in data communication with said time of flight camera, said processor configured to analyze said captured images from said time of flight camera to determine agronomic properties of said open seed trench, said agronomic properties selected from the group consisting of: trench depth, trench collapse percentage and trench shape.

2. The agricultural implement of claim 1, further comprising:
   a gas dispenser disposed to expel gas into a space between said time of flight camera and said open seed trench.

3. The agricultural implement of claim 1, wherein said time of flight camera has a lens comprising an electrostatic coating to repel dust.

4. The agricultural implement of claim 3, further comprising:
   an electrostatic charging system disposed proximate to said time of flight camera.

5. The agricultural implement of claim 1, wherein said time of flight camera has a hydrophobic coating.

6. The agricultural implement of claim 1, further comprising:
   a row cleaner assembly disposed forward of said opening assembly of said at least one row unit, said row cleaner assembly disposed to engage the soil surface to move soil and residue from the soil surface laterally with respect to the forward direction of travel and forward of said opening assembly.

7. The agricultural implement of claim 6, wherein said time of flight camera captures images of said soil surface a distance laterally to each side of said open seed trench and wherein said processor is further configured to analyze said captured image to detect a presence of an extra trench laterally of said open seed trench produced by said row cleaner assembly.

8. The agricultural implement of claim 6, further comprising a sensor mounted to the agricultural implement and oriented toward the soil surface forward of said row cleaner assembly to detect soil mounds forward of said row cleaner assembly.

9. The agricultural implement of claim 8, wherein said sensor comprises one of: a camera, a time of flight camera, a radar, an ultrasonic sensor, a LIDAR, and a laser line triangulator.

10. A method for adjusting row cleaners on an agricultural implement, wherein said agricultural implement includes:
    at least one row unit, each said at least one row unit including an opening assembly and a seed delivery device, the opening assembly configured to open a seed trench in a soil surface and the seed delivery device configured to deposit seed in said open seed trench as the agricultural implement travels in a forward direction of travel, and
    a row cleaner assembly having row cleaner wheels disposed forward of the opening assembly of the at least one row unit, said row cleaner assembly including a row cleaner actuator configured to adjustably position the row cleaner wheels relative to the soil surface;
    said method comprising:
    (i) capturing an image of the open seed trench and laterally adjacent to each side of the open seed trench with an image capture device disposed on the row unit rearward of said opening assembly and looking down from above said open seed trench after the seed is deposited in said open seed trench, and with a processor in data communication with said image capture device, analyzing the captured images to detect a row cleaner adjustment condition, wherein said row cleaner adjustment condition includes detection within the captured images of:
        (a) at least one of: (i) presence of dry soil adjacent to said seed trench, (ii) presence of residue in said open seed trench and (iii) presence of dry soil on the seed in said open seed trench; and
        (b) presence of an extra trench formed in the soil surface laterally adjacent to each side of said open seed trench by said row cleaner wheels;
    (ii) with said processor in signal communication with said row cleaner actuator, actuating said row cleaner actuator to adjustably position said row cleaner wheels relative to the soil surface based upon said detected row cleaner adjustment condition.

11. The method of claim 10, wherein upon said image processor detecting said row cleaner adjustment condition (a), said processor actuating said row cleaner actuator to lower said row cleaner wheels relative to the soil surface.

12. The method of claim 10, wherein upon said image processor detecting said row cleaner adjustment condition (b), said processor actuating said row cleaner actuator to raise said row cleaner wheels relative to the soil surface.

13. The method of claim 10, wherein a sensor is disposed on the agricultural implement and oriented toward the soil surface forward of said row cleaner assembly, said sensor in data communication with said processor, said method further comprising:
    said processor analyzing data from said sensor to detect soil mounds forward of said row unit and, upon detection of said soil mounds, actuating said row cleaner actuator to raise said row cleaner wheels relative to the soil surface.

14. The method of claim 13, wherein said sensor comprises one of: a camera, a time of flight camera, a radar, an ultrasonic sensor, a LIDAR, and a laser line triangulator.

15. A method for adjusting depth of a seed trench opened by an agricultural implement in a soil surface, the agricultural implement, including:

a row unit including an opening assembly having two opening discs rollingly mounted to a downwardly extending shank and disposed to open the seed trench in the soil surface, gauge wheels, and a depth adjustor for setting a position of the gauge wheels relative to the opening discs for limiting a depth of penetration of the opening discs into the soil surface, and the row unit further including a seed delivery device configured to deposit seed in said open seed trench;

a time of flight camera disposed on said row unit to capture images of said seed open trench looking down from above said open seed trench after the seed is deposited in said open seed trench; and a processor in data communication with said time of flight camera and configured to process said captured images to measure a depth of said open seed trench within said captured images, said processor in signal communication with said depth adjuster and configured to actuate said depth adjuster to adjust a depth of said open seed trench by adjusting a positioning the gauge wheels relative to the opening discs;

wherein said method comprises:

said processor comparing said measured depth of said open seed trench to a desired seed trench depth input; and said processor generating a signal to actuate said depth adjustor to adjust the position of the gauge wheels relative to the opening discs until said measured depth approaches said desired seed trench depth.

16. A method for placing liquid relative to a seed in a seed trench opened by an agricultural implement, the agricultural implement including:

a row unit including an opening assembly having two opening discs rollingly mounted to a downwardly extending shank and disposed to open the seed trench in the soil, a seed delivery mechanism for depositing seed in the open seed trench, and a valve in fluid communication with a fluid source;

a time of flight camera disposed on said row unit to capture images of said open seed trench looking down from above said open seed trench and after the seed is deposited in said open seed trench; and a processor in data communication with said time of flight camera, said processor configured to process said capture images to detect said seed in said open seed trench;

wherein said method comprises:

said processor generating a seed pulse upon detection of each seed in said open seed trench; and with each generated seed pulse, said processor generating a signal to open the valve to dispense fluid on or adjacent to each seed in said open seed trench.

17. An agricultural implement, comprising:

at least one row unit, each said at least one row unit including an opening assembly and a seed delivery device, the opening assembly configured to open a seed trench in a soil surface and the seed delivery device configured to deposit seed in said open seed trench as the agricultural implement travels in a forward direction of travel;

a row cleaner assembly having row cleaner wheels disposed forward of said opening assembly of said at least one row unit, said row cleaner assembly including a row cleaner actuator configured to adjustably position the row cleaner wheels relative to the soil surface, said row cleaner wheels configured to engage the soil surface to move soil and residue from the soil surface laterally with respect to the forward direction of travel and forward of said opening assembly;

an image capture device mounted to the at least one row unit rearward of said opening assembly looking down from above said open seed trench after the seed is deposited in said open seed trench to capture images of said open seed trench and the soil surface laterally adjacent to said open seed trench;

a processor in data communication with said image capture device and in signal communication with said row cleaner actuator, said processor configured to analyze the captured images to detect a row cleaner adjustment condition, wherein said row cleaner adjustment condition includes detection within the captured images of:

(a) at least one of: (i) presence of dry soil adjacent to said seed trench, (ii) presence of residue in said seed trench and (iii) presence of dry soil on seeds in said seed trench; and (b) presence of an extra trench formed in the soil surface laterally adjacent to said open seed trench by said row cleaner wheels;

said processor configured to actuate said row cleaner actuator to lower said row cleaner wheels relative to the soil surface upon said processor detecting said row cleaner adjustment condition (a), and said processor configured to actuate said row cleaner actuator to raise said row cleaner wheels relative to the soil surface upon said processor detecting said row cleaner adjustment condition (b).

* * * * *